United States Patent [19]

Crowe

[11] Patent Number: 5,138,561
[45] Date of Patent: Aug. 11, 1992

[54] COMPUTER GRAPHICS PLOTTER CONTROL

[75] Inventor: Robert T. Crowe, Santa Cruz, Calif.
[73] Assignee: Xerox Corporation, Palo Alto, Calif.
[21] Appl. No.: 430,229
[22] Filed: Nov. 1, 1989
[51] Int. Cl.[5] ............................................ G06K 15/00
[52] U.S. Cl. .................................................... 395/103
[58] Field of Search .............................. 364/518–520, 364/237.7 MS, 235 MS, 929.3 MS, 930 MS; 346/29, 35, 138 R, 154

[56] References Cited

U.S. PATENT DOCUMENTS 4,062,648 12/1977 Hennessee ........................... 364/520

Primary Examiner—Arthur G. Evans
Attorney, Agent, or Firm—Townsend and Townsend

[57] ABSTRACT

A control system for a multi-color computer graphics plotter is disclosed. The control system divides the plot into a plurality of bands and calculates the approximate time required to draw each figure in each band in the required color. An intermediate output from the control system is the approximate total time required to draw each color in the plot. The control system, using a design philosophy of miximizing for the plotter's throughput, decides whether the plot will be completed faster if the plotter is (a) simply driven at its fastest speed, (b) slowed for at least one of the color passes, and (c) coupled to memory; and the entire plot stored temporarily.

5 Claims, 5 Drawing Sheets

COMPUTER GRAPHICS PLOTTER CONTROL

BACKGROUND OF THE INVENTION

This invention is in the field of computer graphics. More specifically, it is a method and apparatus for controlling a computer graphics raster plotter in a manner which improves the quality of the plot.

Computer graphics can be defined as any output from a computer that is presented in pictorial form. Although this definition does not necessarily exclude text, the main thrust of computer graphics is the display of graphs, pictures, maps and other similar types of data.

Devices used to display computer graphics output include Cathode Ray Tubes ('CRTs'), Liquid Crystal Displays ('LCDs') and single- or multi-color plotters. Graphics display units must be able to both accept a high rate of data input and display that data accurately and very quickly.

Although it is possible to control a graphics plotter directly from the computer generating the plot, this often results in slowing down the rate at which the plot is outputted. Typically, plotters print one line of the plot at a given time. The data for each of these lines must be supplied to the plotter in a particular, "rasterized" form. The rate at which the computer can convert graphics data into rasterized form is often considerably less than the maximum speed that the plotter can print or display that data. If the computer is directly coupled to the plotter, this discrepancy in speeds slows the plotter's rate of output in an undesirable way.

One solution to the problem of rasterizing data quickly enough to drive the plotter at high speeds has been to place an intermediate unit or "controller" between the computer generating the graphical output and the plotter which draws it. In simple terms, the controller accepts high level commands from the computer such as "draw a line from X,Y coordinates 2,7 to X,Y coordinates 6,9". The controller reduces these high level commands into simpler commands and decides where dots or pixels need to be drawn or activated to create such a line. After the pattern of dots has been calculated, the controller commands the plotter to start printing, using the calculated dot pattern.

Many controllers use two stages to create the desired final output. FIG. 1 shows such a controller. The controller receives graphics commands over line 12 from host computer 13. Parser 17 takes these commands and breaks them down into a simpler set of commands. Then the parser divides the proposed output image into a series of so-called raster bands. The size of these bands is determined by the size of the individual buffer memories that are associated with rasterizer 19. For example, if rasterizer 19 has 256K RAM buffer memories, the number of pixels which can be generated on any given line multiplied by the number of lines in each band will equal at most 256k. The parser also determines what objects will be drawn in each band. Once the commands and the contents of all the raster bands in a given plot are calculated, this information is forwarded to rasterizer 19.

Rasterizer 19 calculates exactly which pixels in each band must be turned on to create the desired image (this calculation is repeated for each color ink that the plotter can use for each raster band). As these calculations are completed and the raster buffer memory for a given band is filled, the rasterizer begins writing to another raster buffer memory, if such is available. If only one raster memory is available, the raster memory sends its contents to the plotter while the rasterizer waits to generate more information. Most, if not all controllers have at least two buffer memories. Each buffer is written to in succession, and outputs its data as soon as it is filled and when the plotter can accept the data. The process of calculating the pixels to be turned on, filling alternatively raster memory 21 or 23 therewith, and directing the contents of the raster memories to plotter 25 continues until all graphic information has been outputted.

If there were only one buffer, plotting operations would frequently have to slow down. In some machines this type of problem was solved by creating a large frame buffer to store data for the entire plot at one time. This approach has limited utility as plots often exceed the storage capacity of the frame buffer.

It is obvious that as the complexity of the output increases, the length of time necessary for rasterizer 19 to calculate the exact pixel representations of the image for each color used by the plotter will also increase. When this complexity reaches a certain point, the memory buffer or buffers are able to output their contents much more quickly than rasterizer 19 can refill them. As this time differential increases, more and more pauses in the printing process develop, due to the buffer memories waiting for more output data.

With many types of plotters, the pauses which occur when the rasterizer cannot fill the buffer memory quickly enough to keep the plotter moving create serious problems. For example, in laser plotters, dry toner may adhere to the fusing drum during the pause, ruining the drum and requiring repair or replacement. In electrostatic plotters, liquid toner begins to soak the paper during the pauses, creating a dark band of color where the paper was stopped, which band is called a "toner bar." Even in a CRT or LCD display, the pause of the cursor while more data is being generated by the rasterizer is, if not harmful, at least distracting. All these outcomes are an undesirable consequence of there being insufficient output from the rasterizer to keep pace with the output device's maximum output speed.

The attempts to solve these problems have so far been unsatisfactory. Some plotters have a user adjustable speed control which gives the operator the option to slow the movement of paper in the plotter, thereby giving the rasterizer more time to fill the respective buffers. Unfortunately, this manual method requires the operator to study the prospective plot prior to its actual printing and determine if the density of characters and color is too great to allow continuous high-speed paper movement. Also, in a plot requiring multiple passes, each pass using a different color ink, slow paper movement may only be necessary for one pass and not the others. Presetting the machine to slow speed in this instance will waste time during most of the passes in order to accommodate the single slow pass. In laser plotters, a standard technique has been to abort the plot if a situation occurs where the paper needs to be halted. Although the abort protects the fusing drum, it requires that a completely new plot be drawn. As the complexity of the plot has not changed, there is no guarantee that repeated aborts will not occur. This is obviously expensive in computer time and paper.

A clear need thus exists for a controller for use with computer graphics output devices which can determine, prior to the start of either plotting or display, if the proposed output can be rasterized quickly enough to drive the plotter device at its highest speed and, if it cannot be rasterized that quickly, the controller should determine if slow speed output is preferable or if temporary storage on some intermediate memory would result in the maximum possible output speed.

SUMMARY OF THE INVENTION

The present invention is a control system for a computer graphics monochrome or multi-color raster plotter. The use of the present invention is also envisioned in graphics plotters of all types, CRT or LCD display units, and other such devices.

The control system operates in close conjunction with the parser and rasterizer. Graphics data is received from the host computer in a high level data format that may or may not be sorted into bands or color separated. The parser if necessary breaks the data into sorted graphical elements. In this description, the terms 'elements' and 'phrases' are used to mean the computer commands which draw the various objects in the plot. These elements are often simpler elements than those used to describe the original form of the data. For example, polygons can be fractured into trapezoids and a single rectangle may be broken into several smaller rectangles. Plots are generally split into a series of bands, the length of each band being determined by the number of pixels on each line and the size of the raster buffer memories. Graphical objects often extend over several of these raster bands.

The parser sorts the elements so that only those elements which draw objects in the current band are sent to the rasterizer. As the larger, more complex graphical objects are split at band boundaries, they are placed in "sort bins". There is one sort bin for each raster band. When the parsing process is completed, rasterization begins. Data is sent to the rasterizer at the rate of one sort bin at a time, the next sort bin being determined by the direction of paper movement. In the present invention elements are not color separated, so all elements are sent to the rasterizer for each color pass. The rasterizer determines which elements are to be executed using the color of the current pass. In other embodiments of this invention, elements may be sent to the rasterizer in a color separated format.

The present invention cooperates with the parser during the sorting routines. During parsing, a timing measurement is made for each element and the total time required to execute each element is stored. The routines which break up larger, unsorted graphical objects into simpler, sorted objects are herein known as "phrase generators". When these phrase generators are ready to insert a new phrase or element into a sort bin, they do two things. First, a routine is called which determines the time required to draw the phrase or element. The timing data is passed to a sort routine which determines what color inks must be used to create the correct color for the phrase. The drawing time for each ink or toner needed to draw the phrase is added to the drawing time for that particular ink or toner for the particular raster band in which the phrase is to be executed. Thus, a running total time for each band for each ink is maintained. As every phrase requires some minimum amount of processing time even in those bands and color passes in which it is not executed, the sort routine also adds this minimum time to the time totals for each ink color.

The result of this processing is that at the end of the parsing for the entire plot, there is a time estimate for the required rasterizing time for each color ink in each raster band. This information is stored in a sort bin table and is used by the controller to determine the proper course of action for outputting the plot.

The controller has two basic options once it determines that rasterization cannot be completed quickly enough to drive the plotter directly at full speed. The basic determination that data cannot be rasterized quickly enough to maintain maximum output speed is made using the drawing time determination. The speed at which data can be rasterized has been determined in the previously described fashion. If this rasterizing time estimate exceeds the maximum speed that data can be rasterized, one of the following options must be exercised.

The first option is to allow the rasterizer to rasterize all the data from the parser and store the rasterized data in an external memory of some sort. Once all the raster data is stored, the external memory is used to send the raster data to the plotter at the rate required for high speed plotting. This option is called spooling.

The second option is to slow the movement of paper through the plotter during the entire plotting process or, alternatively, during one or another of the individual color passes. This option is called speed control.

The choice of which option to select is based on maintaining the greatest overall output from the plotter. A calculation is made as to the total time to complete the plot for each output option. The totals are compared and the lowest one selected. The user can always override the controller's choice.

BRIEF DESCRIPTION OF THE DRAWINGS

The precise method of operation of the present device will now be described in conjunction with the following figures in which.

DETAILED DESCRIPTION OF THE PREFERRED EMBODIMENT

Figure 2:
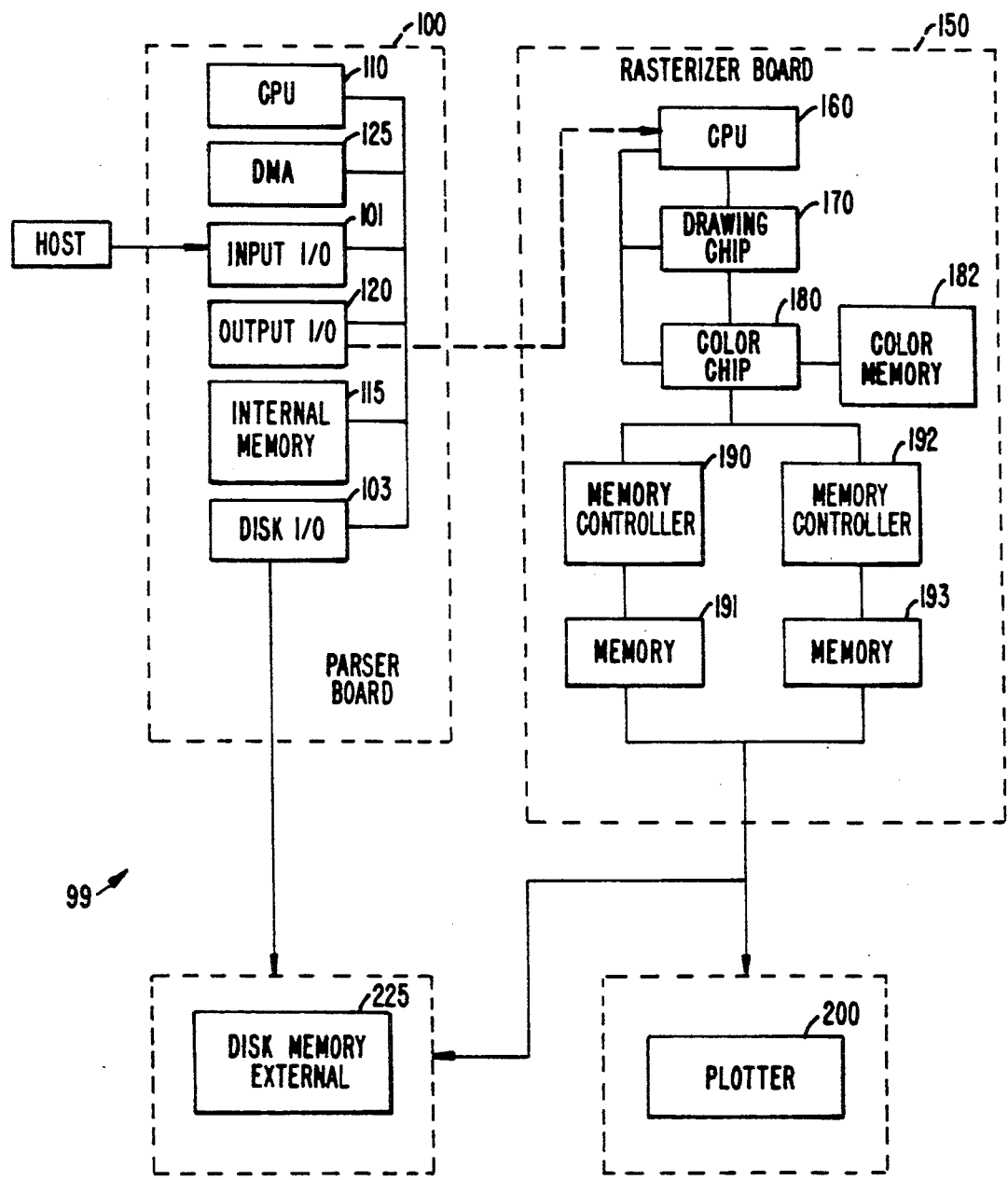
FIG. 2 is a block diagram of the operating environment of the present invention.

FIG. 2 is a block diagram of a graphics controller 99 showing the major components which comprise the operating environment of the present invention. The controller is comprised primarily of Parser Board 100 and rasterizer board 150. Plotter 200 is coupled to the output from rasterizer board 150. External memory 225 is coupled to both parser board 100 and rasterizer board 150. The host computer (not shown) is coupled to parser board 100.

Parser board 100 receives high level graphics commands from the host computer through input I/O 101. Direct Memory Access Controller ('DMA') 125 stores the high level commands received from the host computer in internal memory 115. These commands are reduced into simpler commands by CPU 110. The simpler commands are then returned to internal memory 115. If the storage capacity of internal memory 115 is exceeded, these commands can be stored in external memory 225 by transmitting them through disk I/O 103. Once all commands have been reduced they are sent to rasterizer board 150 through output I/O 120.

The simple commands are transmitted to CPU 160. Upon receiving the data and commands, CPU 160 determines the type of object which must be drawn. Lines, trapezoids, rectangles, and other, more complex objects which can be broken down into these enumerated simple objects are sent to drawing chip 170. Drawing chip 170 decides what portion of each object must be drawn in each band. This process is known as clipping and is known to those skilled in the art. CPU 160 performs the same function for such objects as circles. CPU 160 also determines the line thickness for all objects that have lines.

Color chip 180 receives the rasterized commands from either CPU 160 or drawing chip 170. CPU 160 has also indicated to color chip 180 what color(s) the object(s) is (are) to be. Color chip 180 then determines, by reference to color memory 182, what pixel patterns of each toner are needed to generate the desired color. The patterns are then masked with the rasterized command to create the proper color for the object. An object may require only one toner, or it may require several. It should be noted that each tone requires a separate "pass" over the entire plot, to successively build up the correct colors.

CPU 160, Drawing Chip 170, and Color Chip 180 operate on one band of the entire plot at a time. Only the portion of the whole object which fits within the next band to be plotted is analyzed for the foregoing points (start/finish point, line thickness, color). As the band is being processed, either Memory Controller 190 or Memory Controller 192 store the band's rasterized data in either Memory 191 or Memory 193, respectively. Dual memory controllers and memories allow for the mode of operation where one memory is transmitting its contents to the plotter while the other memory is being filled with data for the next band. For purposes of this description, a Raster Band defines the individual drawing bands being stored in memory. In this system, the maximum number of pixels in each raster band per color/toner is equal to the size in bits of the memories 191 and 193.

Figure 1:
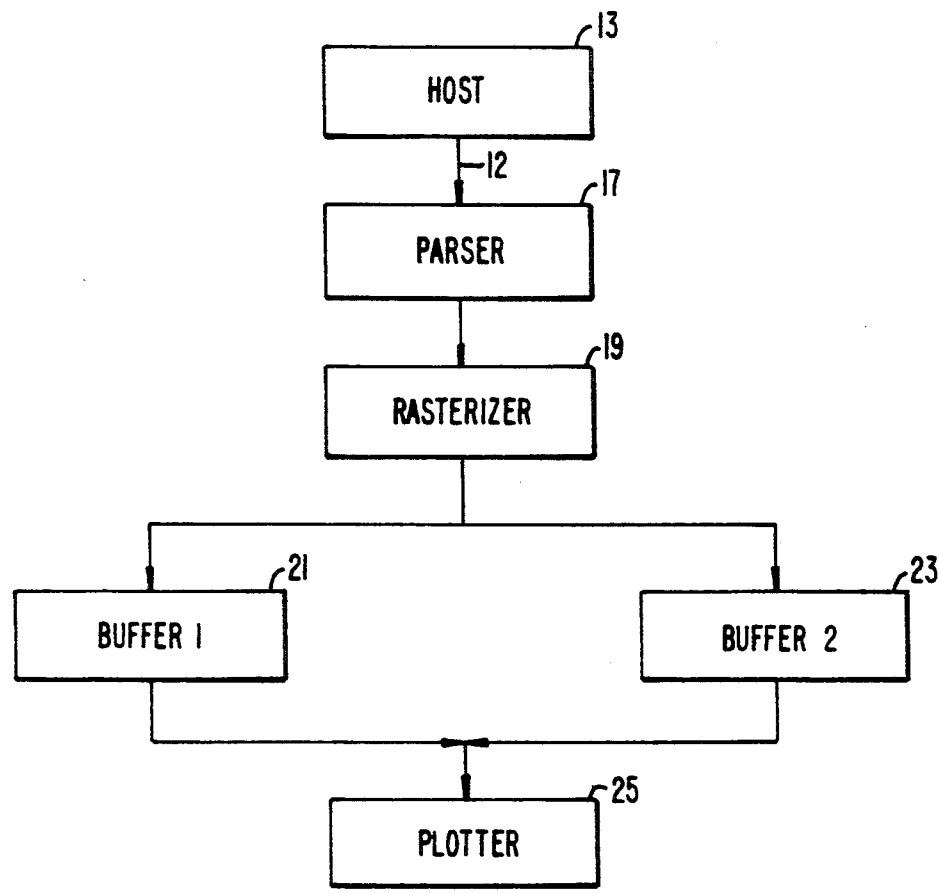
FIG. 1 is a block diagram of a graphics plotter controller without the present invention (Prior Art)
Figure 3:
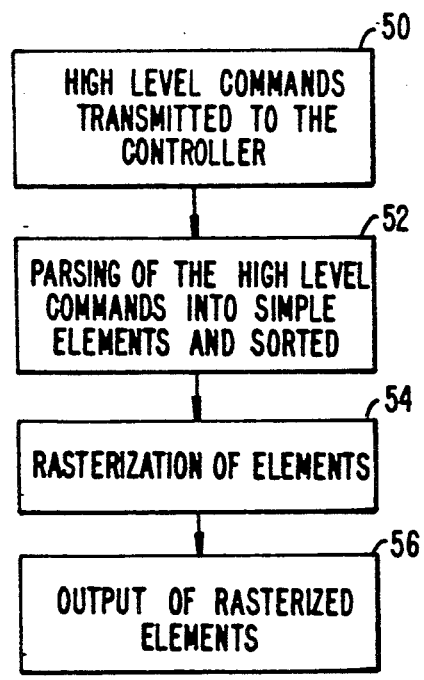
FIG. 3 is a flow chart of the operation of a controller without the present invention (Prior Art)

Overall operation of the plotter without the present invention is represented by the flow chart of FIG. 3. High level data is received from the computer in step 50. The data received from the computer may or may not be sorted or color separated. At parsing step 52, the data is broken down into simpler elements and sorted. For example, polygons may be fractured into trapezoids, a large single rectangle may be broken into several smaller rectangles, etc. These objects are usually split at band boundaries. As discussed previously, the notion of a band refers to the size of the raster buffers. For example, if a band is equivalent to 200 scan lines on a 200 dots-per-inch ('dpi') plotter, then a 10-inch long plot (in the direction of paper movement) will be broken into 10 bands. After the data has been parsed, rasterizing 54 begins. During this step the parsed data is rasterized, meaning that the simple forms delivered from parsing are converted into the exact pattern of pixel elements that are required to recreate the object, one band at a time, placed into the raster buffer memories (FIG. 1) and then output at step 56. As there are two raster buffer memories, one band is being rasterized while the other buffer memory supplies its data to the plotter. This alternation continues until all data has been outputted.

If, during the rasterizing step, it takes longer to rasterize one band than to output the other, the plotter will be "starved" for data and printing will stop, causing the previously discussed problems.

Figure 4:
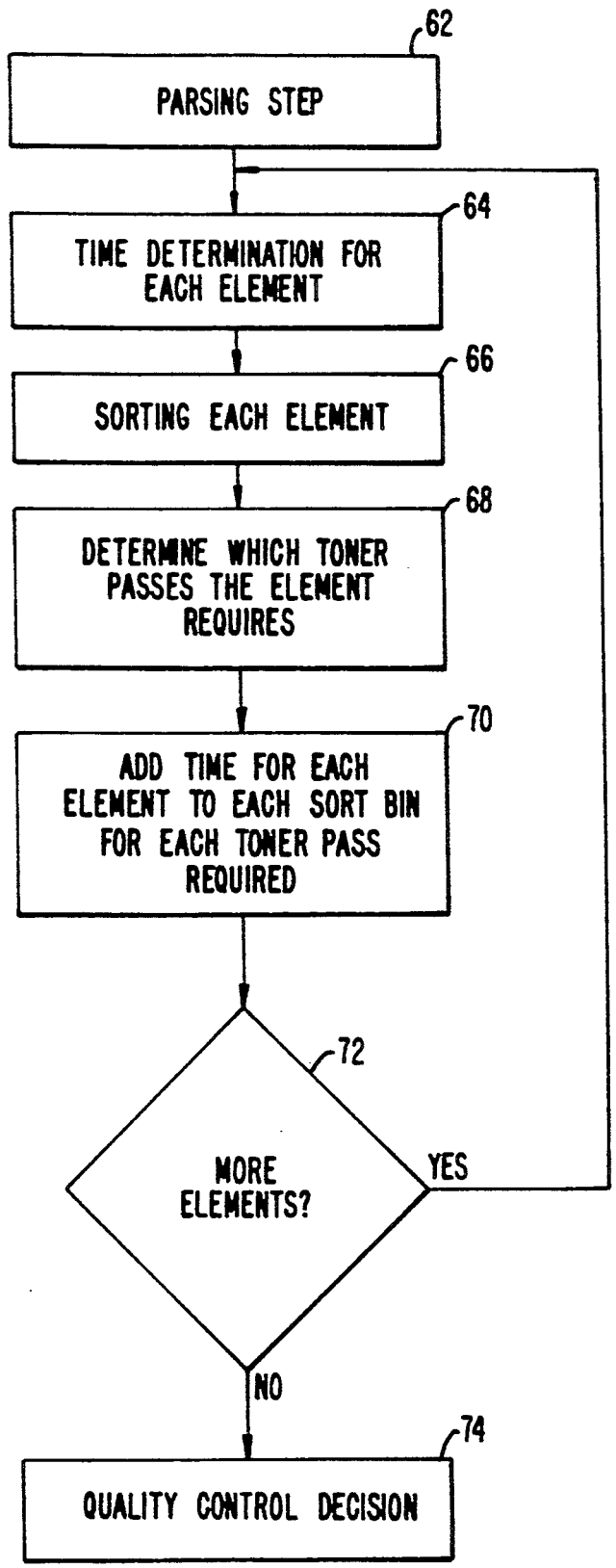
FIG. 4 is a high level flow chart of the overall operation of the present invention.

FIG. 4 is a high level flow chart of how the present invention is incorporated into the standard plotter.

During parsing 62, as complex objects are split at band boundaries, a Sort Bin is established for each band. After the split for each object is determined, the elements needed to draw these simpler objects are sent to a routine, time determination 64, where the time required to draw that element is calculated. The timing data developed by time determination step 64 is then sent to sorting step 66. In step 66 the proper sort bin for the element is found. Next, at step 68 the color of each object is examined to determine which toners are required to draw the object. Before the color determination can be made, the quality of the object, either transparent or opaque, must be known. The terms opaque and transparent have a special meaning herein. Objects may overlie one another in any given plot. The areas where such overlay occurs may be drawn in either a transparent or opaque mode. When transparent, the objects are each drawn completely independently and the toners required for each object are allowed to overlap. When the overlapping area is to be opaque, the second object and its toner completely overwrites the first object. This occurs during rasterization so no actual pigment overlap occurs during opaque drawing.

After the quality and color of the object is determined, several actions take place at step 70. The time required to draw the object is added to the total for the band wherein the object is to be drawn, a separate band total being kept for each different toner. The object's drawing time is only added to the total for each toner pass required to draw the object. As a minimum amount of time is required for each phrase even for those toner passes in which the phrase does not participate, this minimum time is added to the time totals for each toner band pass in which the phrase does not participate.

Steps 64 through 70 are repeated until all elements are processed. Thus, at the end of parsing the entire plot, the time needed to draw each band in each of the four toners is stored in the sort bin table.

After the time per toner band pass is determined, a course of action is needed. Step 74, Quality Control Decision, represents the entire decision making process and will be described in detail subsequently.

The present invention comprises basically two functional blocks: time calculation for each element in each band for each toner and the quality control decision based on the times calculated in the first step. The details of these two steps will now be discussed.

Appendix A contains the computer code, written in the C computer language, which is needed both to perform the time calculation for each element and to make the quality control decision. The code which performs the timing calculations is subdivided into the blocks or macros listed in Table 1 below.

TABLE 1

| | |
|---|---|
| WEIGH_RECT | (Appendix A, p. 1-2) |
| WEIGH_SW_XONLY | (Appendix A, p. 2-3) |
| WEIGH_SW_YONLY | (Appendix A, p. 3) |

TABLE 1-continued

| | |
|---|---|
| WEIGH_TRAP | (Appendix A, p. 4-5) |
| WEIGH_SW | (Appendix A, p. 5-6) |
| WEIGH_CELL_TIME | (Appendix A, p. 6) |
| WEIGH_CELL_TIME_RGB | (Appendix A, p. 6-7) |
| WEIGH_SCAN_TIME | (Appendix A, p. 7) |
| WEIGH_SCAN_TIME_RGB | (Appendix A, p. 7-8) |
| WEIGH_CELL_COLOR | (Appendix A, p. 8-9) |
| WEIGH_CELL_RGB | (Appendix A, p. 9-10) |
| WEIGH_CMYK_RASTER | (Appendix A, p. 10-11) |
| WEIGH_CMYK_TONERS | (Appendix A, p. 11) |
| WEIGH_RSTAMP | (Appendix A, p. 11-12) |
| WEIGH_FVIS_FILL_CIRC | (Appendix A, p. 12) |
| WEIGH_PVIS_FILL_CIRC | (Appendix A, p. 12-13) |
| WEIGH_FVIS_HOLL_CIRC | (Appendix A, p. 13) |
| WEIGH_PVIS_HOLL_CIRC | (Appendix A, p. 13) |
| WEIGH_MW_YONLY | (Appendix A, p. 14) |
| WEIGH_MW_XONLY | (Appendix A, p. 14-15) |
| WEIGH_MW_TOP | (Appendix A, p. 15) |
| WEIGH_MW_MIDDLE | (Appendix A, p. 15) |
| WEIGH_CORNER | (Appendix A, p. 24-25) |
| WEIGH_MIDDLE | (Appendix A, p. 25-26) |
| weigh_mw_top | (Appendix A, p. 26-28) |
| weigh_mw_middle | (Appendix A, p. 28-29) |
| gr_init_autoquality | (Appendix A, p. 29-31) |
| gr_free_autoquality | (Appendix A, p. 31-32) |

As certain common operations are performed in each of the blocks listed in Table 1, these common operations will be discussed first and a functional discussion of the blocks will follow. Whenever these common operations are mentioned during the detailed description of the individual macros, the reader should refer to the discussions below on how these operations are performed.

Determining The Word Write Time

In order to draw or "rasterize" an object into raster memory, write operations into raster memory with the appropriate pattern of ones and zeros required to represent the object accurately must be performed. In the present invention, this is done by performing 16-bit write operations, each of which is referred to herein as a "16-bit word write" or "word write". A known amount of time is required for each word write. The amount of time required to do word writes for either the whole object or a portion thereof is thus equal to the number of word writes needed to draw the object multiplied by the amount of time required for each word write.

Determining the Number of 16-bit Word Writes in the Y Dimension

Many objects are basically filled regions (solid areas of color) which have both an X and a Y dimension. A filled rectangle is the simplest example of this. A filled rectangle can be visualized as a given number of rows of dots, each row extending from a lower value to a higher value in the Y dimension, and then proceeding row by row successively in the X dimension. The row thus defines the width of the rectangle and the number of rows defines the height of the rectangle. Each 16-bit word contains one row of 16 dots in the Y dimension. Successive word addresses will lie next to each other along the same row of dots until the end of the scanline is reached. Once the number of 16-bit word writes needed to draw each row of the object is known, the total number of word writes needed to draw the object is easily calculated, as it equals the number for each row times the number of rows.

The number of 16-bit word writes for each row can be determined as follows where:

Ymin = the minimum Y coordinate for the row and
Ymax = the maximum Y coordinate for the row, $$(Ymax/16) - (Ymin/16) + 1 = \text{Number of 16-bit words/row.}$$

Starting and Ending Operations

The time calculations for many objects includes the starting and ending latency time of the drawing chip. The calculations must also include the time required to load the registers of the drawing chip in order to command it to draw a particular object. Each of these calculations is a simple addition of an empirically determined constant time value. For the present invention, these times are 4.5 microseconds for starting and ending latency and 9.4 microseconds for register loading.

Establishing Minimum Setup and Load Times

To draw most objects, a certain minimum amount of time is necessary to do the calculations and set up the rasterizer. For objects which are larger than a certain minimum size, some of these operations may overlap the drawing process of the previous object. For objects below this minimum size, the drawing time calculated for that object must be increased to a certain minimum time to allow for the possible loss of overlap time. These minimum times are determined empirically by drawing a number of objects at the minimum size and measuring the time required to do so. Establishing the minimum time to draw an object is thus a simple comparison of the total time calculated for the object in the normal manner with a constant (the minimum time which was determined empirically), the greater of the two being used as the drawing time for the object.

Table Lookups

Many objects of the same type can appear in the same plot. Some of these objects may be exactly the same size and shape, and will therefore require exactly the same amount of time to draw. Furthermore, it has been determined that many of these will be in the lower range of dimensions for such objects. For example, it has been found that for a large group of plots, most of the rectangles will contain less than 200 rows of dots in the X direction.

By taking advantage of this fact, duplicate calculations which would give the same result can be eliminated and processing can be speeded up. Tables are established at the beginning of controller operations which will contain the times necessary to draw particular types of objects in a range of sizes. During processing, when determining the time necessary to draw an object, the program checks to see if the object is the same type and size as other objects whose drawing times have already been calculated and stored in the table. If it is, the calculations are not repeated. Instead, the result that was previously calculated is retrieved from the table. At this point in the processing, if the rasterization time of the object in question can be retrieved from the tables, processing of the new element is stopped and the stored result is used. Otherwise processing continues.

Inter-scanline Time

Objects which have sloping sides require a calculation to determine the starting and ending points of each row of dots as drawing proceeds from one row of dots to the next. For example, for a sloping line each row of dots may begin at a slightly different Y value. This requires that after each row of dots is drawn the starting and ending Y values be either incremented or decremented slightly in order to shift the next row of dots in the direction of the slope. The time required for this incrementing or decrementing must be added to the other times that have been calculated as being needed to draw the object. The amount of time which must be added to the total to account for inter-scanline time for the entire object is equal to the amount of such time required for each row times the number of rows.

BCMY versus RGB Color Systems

Two of the most common systems of primary colors used in computer graphics are the BCMY system, which uses black, cyan, magenta and yellow as its primary colors and the RGB color system, which uses red, green, and blue as its primary colors. Either system can be used herein to specify the colors of many types of objects, which results in slight differences in the times needed to rasterize these objects. The primary difference in these calculations concerns the constant referred to as "throw-away time", which is discussed below.

Adding Time to the Sort Bin Table

Once the time required to rasterize a particular object has been calculated, it must be added to the running total which is being kept for the raster band which contains the object. At the conclusion of the first phase of processing, this running total will be an estimate of the time required to rasterize all the objects contained in a given raster band.

Different colors are created by mixing different amounts of the primary set of colors used by the graphics device. Thus, cyan and yellow can be mixed to produce various shades of green. In raster plotters, these different colors require different patterns of dots, with varying densities of dots producing varying densities of color. This requires a separate application of toner or ink for each of the primary set of colors, which in turn requires a separate pass of the plotter's writing head along the length of the plot to apply dots in each of the separate colors. Often the data for each pass must be rasterized separately in order to produce the pattern of dots required to arrive at the correct colors.

This process is related to he concepts of opaque rasterization versus transparent rasterization. In opaque rasterization, each new object is represented in such a way as to completely obscure objects which were drawn earlier and which it overlays. In transparent rasterization the new objects are represented in a way which allows objects which are drawn beneath other objects to be seen. Thus for opaque rasterization, the pattern of ones and zeros left in raster buffer memory by the rasterization of previous objects must be replaced with the pattern of dots required by the object currently being rasterized. For transparent rasterization, the results of previous rasterization operations are left in the raster buffer memory, only those dots necessary to rasterize the current object being inserted.

A further complication is that dots of each of the primary colors may overlap each other on the paper. For opaque rasterization, the pattern of ones and zeros in raster buffer memory from the previous rasterization operations must be replaced with those required for the current object during each color pass. For transparent rasterization, the pattern of ones needed to produce the dots of color necessary for the current object must be added. This means that during primary color passes in which the current object does not participate no rasterization is performed.

Thus the time needed to rasterize an object during each color pass need only be added to the times for those color passes in which the object must be rasterized. For opaque objects, the object's time must be added to the times for all passes, as the object must be rasterized in all of the passes. For transparent objects, the current object's time must only be added to those passes which are required to draw the current object. This is determined by examining the color of the object when its time is to be added into the sort bin which will contain its phrase, and also by considering whether the object is to be drawn transparently or opaquely. Some time is required by the rasterizer to read the phrase even during color passes for which the phrase does not need to be rasterized. This "throw-away time" must be added to the running time total for these passes. The amount of this time will vary depending on whether the color of the object is defined in terms of BCMY or RGB. These throw-away times are determined empirically by measuring the time required to process phrases during a color pass which does not require their rasterization.

INDIVIDUAL TIMING MACROS

Each of the timing macros contained in the current embodiment will now be discussed in some detail. The terms and calculations discussed in the previous sections will be referred to in these discussions as they apply to each of the individual macros. It should be noted that each of these macros relates to a particular kind of graphical object and that they are used in the calculation of the time necessary to rasterize an object of this type. Different rasterizer architectures will use a different set of graphical objects to render the desired images, and will therefore use a different set of calculations to determine rasterization times. Also, different sets of rasterizer hardware will have different timing characteristics and these must be reflected in the timing calculations used with each rasterizer. It should also be noted that while macro definitions are used in the current embodiment for these calculations, subroutine calls or in-line code could be used just as easily, resulting primarily in a change of programming style.

Figure 5:
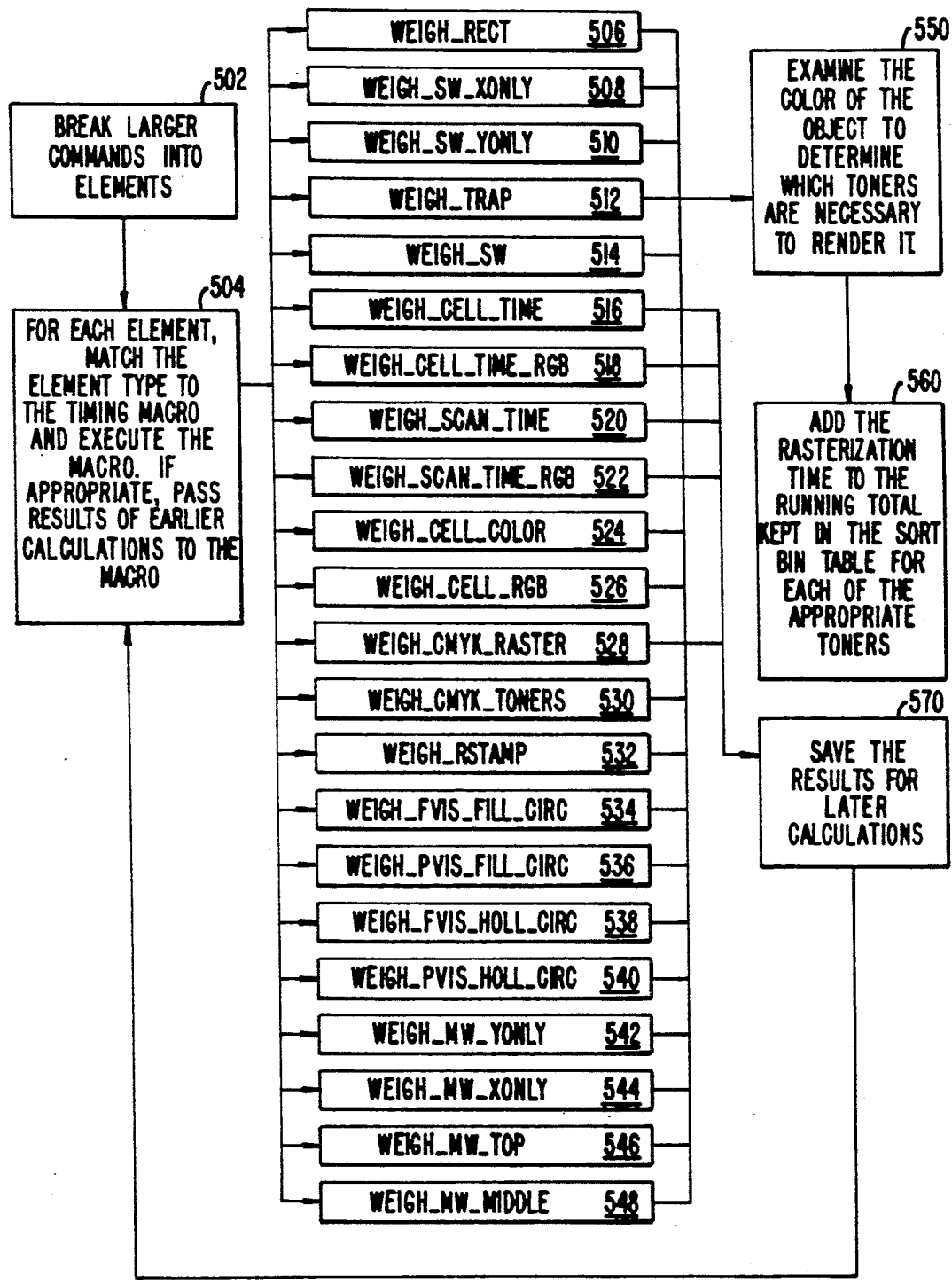
FIG. 5 is a flow chart of the timing calculation section of the present invention.

Prior to entering any of these macros, the more complex commands received from the host computer are broken into simpler elements. This is shown in FIG. 5 as step 502. Once the commands are reduced to simple elements, the element type is matched to a timing macro and the macro is executed (FIG. 5, step 504). The individual timing macros perform their timing calculations in the manner described below.

WEIGH_RECT (FIG. 5, step 506; App. A, p. 1-2)

This macro is used to calculate the rasterization time for a rectangle. First, the number of word-writes for a single row of dots is calculated by determining the number of 16-bit word writes in the Y dimension. Then the dimensions of the rectangle are checked and a table lookup performed to see if a similar rectangle has already been rasterized. If it is necessary to continue, the word-write time is calculated. The starting and ending latency and register load time is then added and set to the minimum setup and load time, if necessary.

WEIGH_SW_XONLY (FIG. 5, step 508; App. A, p. 2-3)

This macro is used to calculate the rasterization time for a line or vector phrase which has a width of one and which extends only in the X dimension. First, the dimensions of the vector are checked and a table lookup is done. If it is necessary to continue, the number of word-writes required is calculated. This will equal the number of dots to be drawn in the X dimension, as a word write must be done for each dot in this case. The word-write time is then calculated. The starting and ending latency and register load times are then added and the sum reset to the predefined minimum setup and load time when necessary.

WEIGH_SW_YONLY (FIG. 5, step 510; App. A, p.3)

This macro calculates the rasterization time for a line or vector phrase which has a width of one and which extends only in the Y dimension. First, the number of word-writes for the vector is calculated. Then the dimensions of the vector are compared to those in the table. If it is necessary to continue, the word-write time is calculated. The starting and ending latency and register load time is added and the total set to the minimum setup and load time when appropriate.

WEIGH_TRAP (FIG. 5, step 512; App. A, p. 4-5)

This macro calculates the rasterization time for a trapezoid. First, the number of word-writes for both the top and bottom rows of dots is calculated. Whether the trapezoid is entirely contained in the visible drawing region or it extends outside of this region is then considered. This consideration affects the number of word-writes performed for each row of dots. The number of word-writes will approximate the average of the top and bottom rows if the trapezoid is entirely within the visible region, but will be equal to the larger of the two if the trapezoid is not entirely within this region. The requisite table lookup is then performed. If it is necessary to continue, the word-write time is calculated. The inter-scanline time is added to this sum, along with the starting and ending latency and register load times. The final sum is set to a minimum setup and load time if necessary.

WEIGH_SW (FIG. 5, step 514; App. A, p. 5-6)

This macro calculates the rasterization time for a vector phrase which has a width of one and which extends in both X and Y dimensions. First, the absolute value of the delta Y value for the vector is calculated. Then the table lookup is performed. If it is necessary to continue, the word-write time for the vector is calculated. The inter-scanline time is added along with the starting and ending latency and register load times. Finally, the sum is compared to a minimum setup and load time and set to the minimum if necessary.

WEIGH_CELL_TIME (FIG. 5, step 516; App. A, p. 6)

This macro calculates the time required to rasterize a single "cell" of a larger "cell array" which uses the BCMY color system to define its colors. A cell array is a two dimensional rectangular array of filled rectangles, each of which may be a different color. First, the word-write time is calculated. Separately, the starting and ending latency and register load time are added and saved as the "setup time". These results, the rasterization time per cell and the setup time, are saved and used later by the WEIGH_CELL_COLOR macro.

WEIGH_CELL_TIME_RGB (FIG. 5, step 518; App. A, p. 6-7)

This macro calculates the time required to rasterize a single "cell" of a larger "cell array" which uses the RGB color system to define its colors. It performs exactly the same calculations as WEIGH_CELL_TIME, but the results are used later by WEIGH_CELL_RGB instead of WEIGH_CELL_COLOR.

WEIGH_SCAN_TIME (FIG. 5, step 520; App. A, p. 7)

This macro calculates the time required to rasterize a single pixel of a larger "scan row" which uses the BCMY color system to define its colors. A scan row is a one dimensional row of pixels, each of which may be a different color. First, the word-write time is calculated. Then the starting and ending latency and register load time is calculated. The results are saved and used later by the WEIGH_CELL_COLOR macro.

WEIGH_SCAN_TIME_RGB (FIG. 5, step 522; App. A. p. 7-8)

This macro calculates the time required to rasterize a single pixel of a larger "scan row" which uses the RGB color system to define its colors. It performs exactly the same calculations as WEIGH_SCAN_TIME, but the results are used later by WEIGH_CELL_RGB instead of WEIGH_CELL_COLOR.

WEIGH_CELL_COLOR (FIG. 5, step 524; App. A, p. 8-9)

This macro is used by the cell array and scan phrase generators to add the proper rasterization time for each cell or pixel to the appropriate running totals of each toner pass. This macro is used for cell arrays or scan rows which use the BCMY color system. It first locates the entry in the Sort Bin Table for the appropriate raster band. It then multiplies the time required to rasterize each cell by the number of cells. These cells will all be the same color and adjacent to one another. It then adds the setup time for the entire group of cells once, as the entire group can be rasterized in one operation. It then resets the time to the predefined minimum setup and load time if necessary. Finally, the calculated time is added to the running totals for each of the appropriate color passes.

WEIGH_CELL_RGB (FIG. 5, step 526; App. A, p. 9-10)

This macro is used by the cell array and scan row phrase generators to add the rasterization time for each cell or pixel to the appropriate running totals for each toner pass. This is used for cell arrays or scan rows which define their colors using the RGB color system. It performs exactly the same sequence of calculations as WEIGH_CELL_COLOR, but uses a different constant for its throw-away time.

WEIGH_CMYK_RASTER (FIG. 5, step 528; App. A, p. 10-11)

This macro is used by the CMYK raster phrase generators to calculate the rasterization time for a single row of dots in a CMYK raster object. A CMYK raster object is a two dimensional array of pixels which has been color separated using the BCMY color system. First, the length of the current row of dots is compared to the previous row which has already been processed. If it is identical, the result of the previous calculation is re-used. Otherwise, the current length is multiplied by an empirically determined constant and the result is saved for use in the calculations concerning the next row of dots.

WEIGH_CMYK_TONERS (FIG. 5, step 530; App. A, p. 11)

This macro is used by the CMYK raster phrase generators to add the rasterization time for each row of dots to the appropriate running totals for each toner pass. Flags are used by the routine to determine which toners are required to render the color of the object. It then adds the calculated time to the running totals for each of the appropriate color passes.

WEIGH_RSTAMP (FIG. 5, step 532; App. A, p. 11-12)

This macro is used by the Raster Stamp phrase generators to calculate the rasterization time for a "raster stamp". A raster stamp is a two dimensional array of colored dots which has not been color separated. These are first defined and then used in a manner similar to the way bitmapped characters are handled in many computer graphics applications. First, the word-write time is calculated. Then the starting and ending latency and the register load time is added. This sum is compared and reset to a minimum setup and load time, if necessary.

WEIGH_FVIS_FILL_CIRC (FIG. 5, step 534; App. A, p. 12)

This macro calculates the rasterization time for a filled circle which is entirely within the current raster band. It first checks to see if the radius of the circle is within a certain range for which empirical time measurements have been made. If it is, it uses one of these measurements as its result. If it is not, it multiplies the radius by an empirically determined constant to arrive at its result.

WEIGH_PVIS_FILL_CIRC (FIG. 5, step 536; App. A, p. 12-13)

This macro calculates the rasterization time for a filled circle which is not completely within the current raster band. It first determines the portion of the circle which is within the current raster band. It uses both the band number and the log base 2 of the number of scanlines contained in each band to calculate the X values for the first and last scanlines in which the circle is drawn in the raster band. It then takes the minimum of either the maximum X value for the circle or the X value for the last scanline in the raster band and subtracts from this number the maximum of either the minimum X value for the circle or the X value for the first scanline in which the circle is drawn in the raster band. The result of this is the X dimension of the circle in this raster band. The macro then checks to see if this dimension is within a certain range for which empirical time measurements have been made. If it is, it uses one of the empirical measurements as its result. If it is not, it multiplies the radius by an empirically determined constant to arrive at its result.

WEIGH_FVIS_HOLL_CIRC (FIG. 5, step 538; App. A, p.13)

This macro is used to calculate the rasterization time for a hollow circle, similar to a doughnut, which is entirely within the current raster band. It simply multiplies the radius by both an empirically determined constant and by the width of the filled region of the circle to arrive at its result.

WEIGH_PVIS_HOLL_CIRC (FIG. 5, step 540; App. A, p. 13)

This macro calculates the rasterization time for a hollow circle, similar to a doughnut, which is not completely within the current raster band. It first determines the portion which is within the current raster band. It uses both the band number and the log base 2 of the number of scanlines contained in each band to calculate the X values for the first and last scanlines in the raster band. It then takes the minimum of either the maximum X value for the circle or the X value for the last scanline in the raster band and subtracts from this number the maximum of either the minimum X value for the circle or the X value for the first scanline in the raster band. The result of this is the X dimension of the circle in this raster band. It then multiplies this X dimension by an empirically determined constant and by the width of the filled region of the circle to arrive at its result.

WEIGH_MW_YONLY (FIG. 5, step 542; App. A, p. 14)

This macro calculates the rasterization time for a line whose width is greater than one, and which has only a Y dimension. It first calculates the word-write time. It then adds the starting and ending latency and the register load time. The result is set to the minimum for setup and loading, if necessary.

WEIGHT_MW_XONLY (FIG. 5, step 544; App. A, p. 14-15)

This macro calculates the rasterization time for a line whose width is greater than one, and which has an X dimension. It performs exactly the same calculations as WEIGH_MW_YONLY.

WEIGH_MW_TOP (FIG. 5, step 546; App. A, p. 15)

This macro calculates the rasterization time for a line whose width is greater than one and which extends in both the X and Y dimensions, and which has its minimum X value in the current raster band. It simply does a subroutine call to "weigh_mw_top" to calculate its value.

WEIGH_MW_MIDDLE (FIG. 5, step 548; App. A, p. 15)

This macro calculates the rasterization time for a line whose width is greater than one, and which extends in both the X and Y dimensions, and which does not have minimum X value in the current raster band. It uses a subroutine call to "weigh_mw_middle" to calculate its result.

WEIGH_CORNER (App. A, p. 24-25)

This macro is used by weigh_mw_top and weigh_mw_middle to calculate the rasterization time for a triangle which makes up part of a line whose width is greater than one, and which extends in both the X and Y dimensions. It first calculates the absolute value of both the X and Y dimensions of the triangle. It then calculates the number of word writes required for the bottom of the triangle. It then uses either this value or one half of this value to calculate the word-write time for a single row of dots, depending on whether or not the line is completely within the visible drawing region, as in WEIGH_TRAP for trapezoids under the same conditions. It then calculates the inter-scanline time and adds that time and the starting and ending latency to the sum. The result is added to a running total for the line, which is a parameter to be sent to the macros.

WEIGH_MIDDLE (App. A, p. 25-26)

This macro is used by weigh_mw_top and weigh_mw_middle to calculate the rasterization time for a parallelogram which makes up part of a line whose width is greater than one, and which extends in both the X and Y dimensions. It first calculates the absolute value of both the X and Y dimensions of the parallelogram. Next, the number of word writes required for a single row of dots is calculated. Then, either this value or one half of this value is used to calculate the word-write time for a single row of dots, depending on whether or not the line is completely within the visible drawing region, as in WEIGH-TRAP for trapezoids under the same conditions. The inter-scanline time is then calculated and added, along with the starting and ending latency times. Finally, the result is added to a running total for the line, which is sent to the macro.

weigh_mw_top (App. A, p. 26-28)

This subroutine is used to calculate the rasterization time for a line whose width is greater than one, which extends in both the X and Y dimensions, and which has its minimum X value in the current raster band. It uses the macros WEIGH_CORNER and WEIGH_MIDDLE to do much of its work. The length and width of the line define a rectangular region which is not aligned with the X and Y axes. This region thus has four "corners" which indicate its boundaries. It is drawn in three connected regions, the regions being an upper triangle, a central parallelogram, and a lower inverted triangle.

The program begins by calculating the indices of the raster bands which contain the minimum X value of the line and the X value of the next corner, proceeding in the X direction. This region is triangular in shape. It then checks to see if the entire triangle is contained in the current raster band and, if not, it calculates the dimensions of the part which is. It then uses WEIGH_CORNER to calculate the rasterization time for this triangular region. If the entire region is contained in the current raster band, it adds an empirically determined "pause time", which is the time required to set up the drawing chip to continue rasterizing the next region of the line, herein known as the "middle" parallelogram. Next, the index of the raster band which contains the next corner is calculated and used to check to see if the entire middle region, which is a parallelogram, is contained in the current raster band. If it is not, it calculates the dimensions of that portion which is and uses WEIGH_MIDDLE to calculate its rasterization time and add it to the total time for the line so far. If the entire region is contained in the current raster band, it adds the pause time and calculates the index of the raster band containing the maximum X value of the line, which will define the end of the final region of the line, known herein as the "bottom" inverted triangle. It then checks to see if the entire bottom is contained in the current raster band and, if it is not, it calculates the dimensions of the portion which is. It uses WEIGH_CORNER to calculate the rasterization time for the bottom region, and adds this time to the total calculated to this point. Finally, it adds in the register load time and sets the total to a predefined minimum if necessary.

weigh_mw_middle (App. A, p. 28-29)

This subroutine is used to calculate the rasterization time for a line whose width is greater than one, which extends in both the X and Y dimensions, and which does not have its minimum X value in the current raster band. It uses the macros WEIGH_CORNER and WEIGH_MIDDLE to do much of its work. It performs the same calculations as was used in weigh_mw_top for the two "middle" and "bottom" regions.

gr_init_autoquality (App. A, p. 29-31)

This subroutine is used at the beginning of controller processing to set up the tables of common values for many types of objects. To do so it must allocate memory blocks for such tables and insert the proper values into them. It uses several of the macros discussed earlier to calculate the exact values which must be inserted.

gr_free_autoquality (App. A, p. 31-32)

This subroutine is used at the end of controller processing to de-allocate the memory blocks which were allocated in gr_init_autoquality.

The results from macros numbered 506 through 514, 524, 526 and 530 through 548 are then processed at step 550 to determine their color and the toners necessary to create these colors. After the toner requirements are determined, the rasterization time for these elements is added to the sort bin table for the appropriate toners at step 560. The results from macros 516 through 522 and 528 are stored for later calculations at step 570. These steps complete the timing calculation.

QUALITY CONTROL DECISION

After the timing information has been calculated, the appropriate action to insure good plot quality can be selected. Once it has been determined that data cannot be rasterized fast enough to drive the plotter directly at full speed, two basic options are available. The first is to slow down the movement of paper and the other is to complete all rasterization, saving the raster data on disk, prior to starting paper movement. The choice between these options is affected by several factors. The user may have restricted these options to only one choice by configuring the controller in a certain way. This could be the case if the user never wants paper to move at any but the fastest possible speed. Additionally, some plotters do not have the capability of being slowed down. The availability and size of the memory (disk) where the raster data is to be stored determines whether or not the entire plot can be spooled before beginning the output of the plot. In general, if both options are available, the option with the highest throughput (production of a plot of acceptable quality in the least amount of time) will be chosen. For each toner pass, only a single choice will be made. There is no slowing of the paper or raster spooling for partial toner passes.

The first step in making this choice is to examine all sort bins which actually contain data (it should be noted that many sort bins will not contain data). Each sort bin has the time required to rasterize the band associated therewith stored within it. The pass (there is one pass per toner color) which requires the longest time to rasterize is retrieved and used in further calculations. These times are added to the times required to perform a "band switch" (change to the next band). The band switching time is essentially dead time between the rasterization of the present band and the succeeding band. The total length of the plot must also be determined in order to find the time required for each toner pass. The number of copies of the plot to be produced is also considered. If the paper is slowed for the first plot, the paper will move slower for every copy of the plot, not just the first one. If the decision is made to store the raster data, then the raster data can be outputted at top speed for each copy. This option is also affected by the plotter, as some plotters, particularly those which use cut sheets of paper as opposed to a roll of paper, require that all the toner passes for each separate copy be completed before the next copy can be begun. For these plotters, it may be best to spool all toner passes before beginning paper movement, so that all copies can be outputted at maximum speed with a minimum of delay between each copy.

The times required to print the plot for both spooling all raster data and controlling the paper movement speed must be calculated. A separate time total is calculated for both options and the totals are then compared to see which will result in faster plotting. For the spooling option, the disk overhead resulting from the spooling process must be considered. For the speed control option, given that only a certain set of speeds is supported by each plotter, the speed which is just below the maximum rasterization speed for the slowest band of the plots is selected for the comparison operations. The total plotting speed, given this rate of paper movement and the length of the plot must next be calculated. For example, at ½" per second (paper speed), a 12" plot will require 24 seconds. Any extra paper to be included at the beginning or end of the plot and between copies must also be included. For plots which require multiple passes, the time needed to rewind the paper as well as the time needed to plot registration marks must also be included. Registration marks are small blocks or lines printed during the first toner pass and used as markers or spacing indicators during subsequent toner passes. They are necessary as the paper stretches slightly during each pass, requiring continuous realignment. As the plotting of registration marks is done in parallel with the spooling for the first color pass, the time needed for the first pass is effectively reduced. At the end of these calculations, the choice can be made whether to raster spool or speed control the plot for each color pass for all copies of the plot. Typically, different passes will require different spool/speed selections to achieve good plot quality with optimal plotter throughput.

Figure 6:
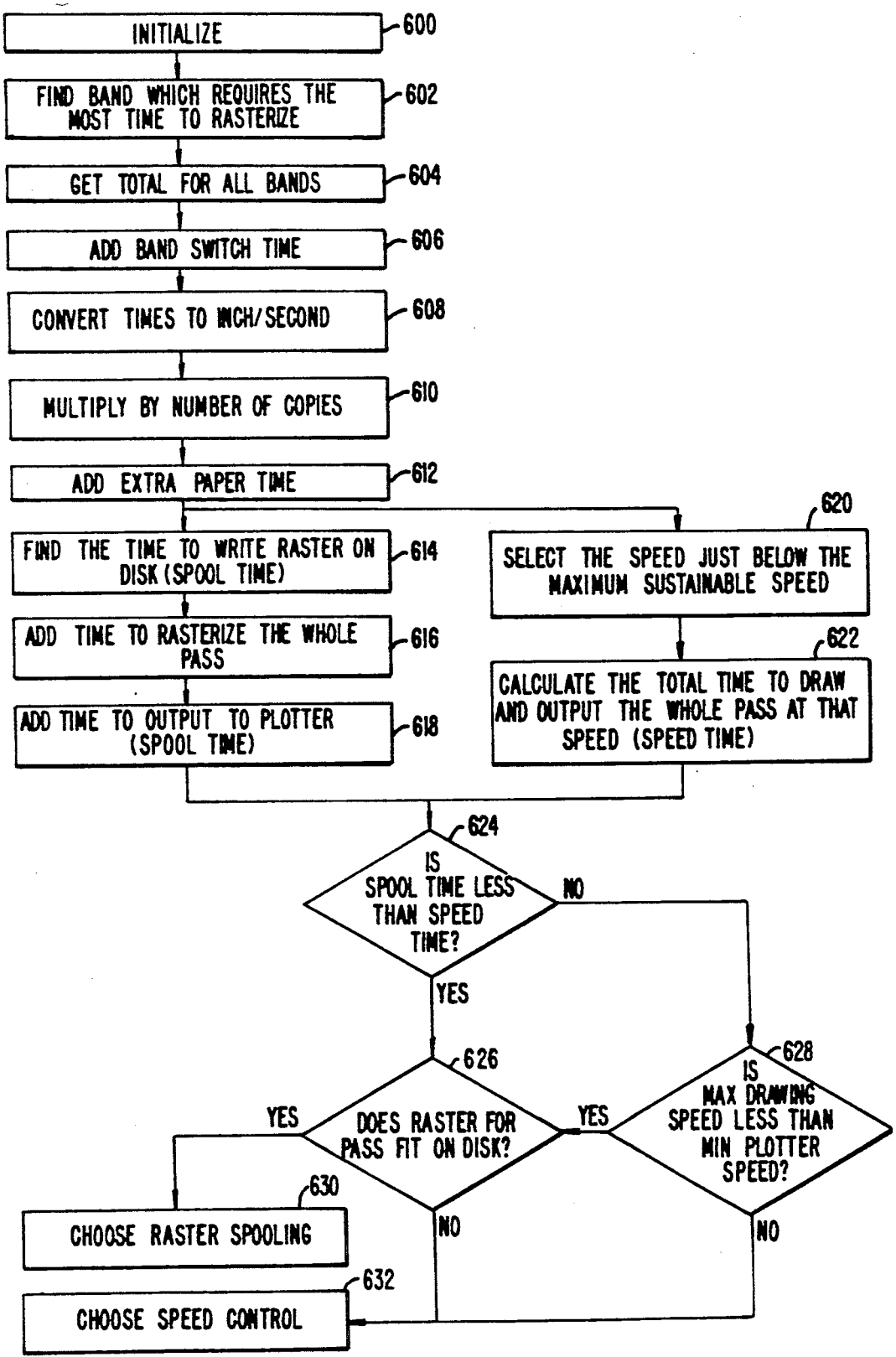
FIG. 6 is a flow chart of the control options selection portion of the present invention.

The operation of the quality control selection program will now be explained with reference to both FIG. 6 and Appendix A, pages 16 through 32.

Initialization step 600 (Appendix A, pp.16-18) initializes the program to the non-spool option and full speed printing of the plot. A test is made to see if the total time to rasterize the plot has exceeded the limit of the time counting variable. If this variable has become negative, then the plot is simply too complex for any option other than spooling the data to the outside disk memory and all other steps in the control options program are skipped.

At step 602 the band requiring the most time to rasterize for each of the four toners in the plotter is selected (Appendix A, pp. 18-19). The time to switch to another band is added to the time retrieved in step 602 at step 606 (Appendix A, p. 19). This time is converted into its equivalent plotter speed in inches per second (step 608, Appendix A, p.19). If multiple copies of the plot are required, the time calculated in step 608 is multiplied by the number of copies (step 610, Appendix A, p. 19) and the extra time required to move the paper the required amount between copies and to buffer the end of the copies is added (FIG. 6, step 612; Appendix A, p. 19).

At step 614 the spooling time for the raster data of the entire pass is calculated (Appendix A, p.20). The spooling time is then added to each color's total drawing time at step 616 (Appendix A, p. 20). The first pass can take advantage of the time to place registration marks on the plot so this time is subtracted from the raster time. Finally, at step 618 the time required to send the plot data to the plotter is added to the running total. This sum is the total time to plot the entire pass using spooling.

At step 620 (Appendix A, p. 20) the paper speed for the plotter is selected. This speed must be just below the maximum speed that data can be rasterized. The total time to output the whole pass at that speed becomes the comparison time. This total time is calculated at step 622.

At step 624, the final spool time is compared to the final speed control time. If the speed control time is less than the spool time, a comparison is made at step 628 to see if the maximum drawing speed time is less than the plotter's minimum paper speed. If it is not, the choice is made to control the speed of the plotter for that color at step 632. On the other hand, if the spool time is found to be less than the speed control time at step 624, spooling is chosen at step 630, unless the spooled data will not fit within the external disk, which test is performed at step 626. In that case, speed control 632 is again chosen.

Although the present invention has been particularly shown and described with reference to preferred embodiments thereof, it will be understood by those skilled in the art that changes in the form and details of the invention may be made without departing from the spirit and scope of the invention. For example, although the invention has been described in the specific environment of a multi-color plotter, it can readily be adapted for use with such display devices as CRTs and LCDs. Therefore, the claims should be interpreted to cover all such modifications and variations which come within the true spirit and scope of this invention.

```
/*-----------------------------------------------------------------------*
 * Copyright (c) 1988 by Versatec, Inc.    All Rights Reserved.
 *
 * gr_autoquality.h        Automatic Plot Quality Macros and Defines
 *                         written by Robert Crowe      13 September 1988
 *
 * This file contains the macros used to predict drawing times for the
 * various phrases sent to Sirius.  It also contains defines associated
 * with the autoquality code.
```

```
*
* Conditional defines are used here to make less work for the compiler.
* The following flags are used to turn on the following definitions:
*
*          FLAG                DEFINE
*          ----                ------
*          AQ_RECT             WEIGH_RECT()
*
* 9/13/88   sdh    a line was missing a "\" in the macro definition
* 9/13/88   rtc    removed mode definitions
* 10/5/89   rtc    added conditional defines
*
*-----------------------------------------------------------------------*/ define FULLY_VIS  0x01   /* same as gr_phrase.h */ define BLACK_TONER   0x01
define CYAN_TONER    0x02
#define RED_TONER     0x04
define YELLOW_TONER  0x08 define THROW_AWAY_TIME 882     /* 8.82 us -- the time to discard a phrase */
                                /* same as in gr_sort.c */ define RGB_THROW_AWAY_TIME 1700 define MAX_RECT_SCAN_WORDS    13
define MAX_RECT_DX           200
#define MAX_XONLY             200
#define MAX_YONLY              13
#define MAX_SNGLW_DX          100
#define MAX_SNGLW_DY          100
#define MAX_TRAP_DX           100
#define MAX_TRAP_DY           100

/*-----------------------------------------------------------------------*
* W E I G H _ R E C T
*     This is the macro that is used to determine the drawing time for
*     a rectangle.
*-----------------------------------------------------------------------*/
#ifdef AQ_RECT
#define WEIGH_RECT(ymin, ymax, dx, drawing_time)   \
    /* s_long ymin, ymax, dx; */   \
    /* u_long drawing_time;   */   \
    {   \
    extern bool gr_do_timing;   \
    extern s_long    gr_AQ_max_rect_scan_words;   \
    extern s_long    gr_AQ_max_rect_dx;   \
    extern u_long    *gr_AQ_rect_table[MAX_RECT_SCAN_WORDS];   \
    s_short word_writes;   \
    \
    /* is autoquality turned on? */   \
    if (gr_do_timing)   \
        {   \
        /* get the number of word writes */   \
        word_writes = ((ymax >> 4) - (ymin >> 4) + 1);   \
        if ((word_writes < gr_AQ_max_rect_scan_words) &&   \
            (dx < gr_AQ_max_rect_dx))   \
            {   \
            drawing_time = *((gr_AQ_rect_table[word_writes])+dx);   \
            }   \
        else   \
            {   \
            drawing_time = word_writes * (dx + 1);   \
            \
            /* multiply by the write cycle time (includes refresh) */   \
            drawing_time *= 55;   \
            \
            /* allow for startup and ending latentcy in the VG2 */   \
            drawing_time += 450;   \
            \
            /* add register load time */   \
            drawing_time += 940;   \
            \
```

```
                /* bring up to minimal setup and load time */   \
                if (drawing_time < 2200)     \
                    drawing_time = 2200;     \
                }   \
        }   \
    }
endif /*-------------------------------------------------------------------------*
 * W E I G H _ S W _ X O N L Y :
 *     This is the macro that is used to determine the drawing time for
 *     single-width X-only lines.
 *-------------------------------------------------------------------------*/
#ifdef AQ_SW_XONLY
#define WEIGH_SW_XONLY(dx, drawing_time)    \
    /* s_long dx; */    \
    /* u_long drawing_time;    */   \
    {   \
    extern bool gr_do_timing;    \
    extern s_long gr_AQ_max_xonly;    \
    extern u_long *gr_AQ_xonly_table;    \
    \
    /* is autoquality turned on? */ \
    if (gr_do_timing)    \
        {   \
        if (dx < gr_AQ_max_xonly)    \
            {   \
            drawing_time = gr_AQ_xonly_table[dx];    \
            }   \
        else    \
            {   \
            /* get the number of word writes */    \
            drawing_time = dx + 1;  \
            \
            /* multiply by the write cycle time (includes refresh) */    \
            drawing_time *= 55;  \
            \
            /* allow for startup and ending latentcy in the VG2 */    \
            drawing_time += 450;  \
            \
            /* add register load time */    \
            drawing_time += 940;    \
            \
            /* bring up to minimal setup and load time */   \
            if (drawing_time < 2200)     \
                drawing_time = 2200;     \
            }   \
        }   \
    }
endif /*-------------------------------------------------------------------------*
 * W E I G H _ S W _ Y O N L Y :
 *     This is the macro that is used to determine the drawing time for
 *     single-width Y-only lines.
 *-------------------------------------------------------------------------*/
#ifdef AQ_SW_YONLY
#define WEIGH_SW_YONLY(ymin, ymax, drawing_time)    \
    /* s_long ymin, ymax */    \
    /* u_long drawing_time;    */    \
    {   \
    extern bool gr_do_timing;    \
    extern s_long gr_AQ_max_yonly;    \
    extern u_long *gr_AQ_yonly_table;    \
    s_short word_writes;    \
    \
    /* is autoquality turned on? */ \
    if (gr_do_timing)    \
        {   \
        /* get the number of word writes */    \
        word_writes = (ymax >> 4) - (ymin >> 4) + 1;    \
```

```
            \
            if (word_writes < gr_AQ_max_yonly)  \
                {   \
                drawing_time = gr_AQ_yonly_table[word_writes];  \
                }   \
            else    \
                {   \
                /* multiply by the write cycle time (includes refresh) */   \
                drawing_time = word_writes * 55;    \
                \
                /* allow for startup and ending latentcy in the VG2 */  \
                drawing_time += 450;    \
                \
                /* add register load time */    \
                drawing_time += 940;    \
                \
                /* bring up to minimal setup and load time */   \
                if (drawing_time < 2200)    \
                    drawing_time = 2200;    \
                }   \
            }   \
        }
endif
/*--------------------------------------------------------------------*
 *  W E I G H _ T R A P:
 *      This is the macro that is used to determine the drawing time for
 *      filled or "line" trapezoids.
 *--------------------------------------------------------------------*/
#ifdef AQ_TRAP
#define WEIGH_TRAP(vis, xmin, dx, top_ymin, top_ymax, bot_ymin, bot_ymax, drawin
    /* u_byte vis; */   \
    /* u_long xmin; */  \
    /* s_short dx, top_ymin, top_ymax, bot_ymin, bot_ymax; */   \
    /* u_long drawing_time; */  \
    {   \
    extern bool gr_do_timing;   \
    extern s_long gr_AQ_max_trap_dx;    \
    extern s_long gr_AQ_max_trap_dy;    \
    extern u_long *gr_AQ_trap_table[MAX_TRAP_DX];   \
    s_short top_words, bottom_words, average_words, inter_scan; \
    \
    /* is autoquality turned on? */ \
    if (gr_do_timing)   \
        {   \
        /* get the number of word writes */ \
        top_words = (top_ymax >> 4) - (top_ymin >> 4) + 1;  \
        bottom_words = (bot_ymax >> 4) - (bot_ymin >> 4) + 1;   \
        \
        if (vis & FULLY_VIS)    \
            average_words = (top_words + bottom_words) >> 1;    \
        else    \
            {   \
            if (top_words > bottom_words)   \
                average_words = top_words;  \
            else    \
                average_words = bottom_words;   \
            }   \
        \
        if ((average_words < gr_AQ_max_trap_dy) && (dx < gr_AQ_max_trap_dx))    \
            {   \
            drawing_time = *((gr_AQ_trap_table[average_words])+dx); \
            }   \
        else    \
            {   \
            /* get the time for Y writes on each scanline */    \
            drawing_time = average_words * 55;  \
            \
            /* find the inter-scanline time */  \
            inter_scan = 370 - drawing_time;    \
            if (inter_scan < 150)   \
                inter_scan = 150;   \
            \
            /* get the total for Y writes */    \
            drawing_time *= (dx + 1);   \
```

```
            \
    /* add in the inter-scanline time */    \
    drawing_time += (dx * inter_scan);    \
            \
    /* allow for startup and ending latentcy in the VG2 */    \
    drawing_time += 500;  \
            \
    /* add register load time */    \
    drawing_time += 1300;    \
            \
    /* bring up to minimal setup and load time */    \
    if (drawing_time < 3200)    \
        drawing_time = 3200;    \
        }    \
    }    \
}
endif /*------------------------------------------------------------------------*
 *  W E I G H _ S W:
 *      This is the macro that is used to determine the drawing time for
 *      single-width vectors that are not X or Y only.
 *------------------------------------------------------------------------*/
#ifdef AQ_SW
#define WEIGH_SW(dx, dy, drawing_time)    \
    /* s_short dx, dy; */    \
    /* u_long drawing_time; */  \
{    \
    extern bool gr_do_timing;    \
    extern s_long gr_AQ_max_snglw_dx;    \
    extern s_long gr_AQ_max_snglw_dy;    \
    extern u_long *gr_AQ_snglw_table[MAX_SNGLW_DX];  \
    s_short words_per_scan;  \
    s_short my_dy;  \
            \
    /* is autoquality turned on? */ \
    if (gr_do_timing)    \
    {    \
        if (dy < 0) \
            my_dy = -dy;    \
        else    \
            my_dy = dy;  \
            \
        if ((dx < gr_AQ_max_snglw_dx) && (my_dy < gr_AQ_max_snglw_dy))    \
        {    \
            drawing_time = *((gr_AQ_snglw_table[dx])+my_dy);    \
        }    \
        else    \
        {    \
            /* get the number of word writes */ \
            if ((my_dy >> 4) > dx)  \
            {    \
                if (dx)  \
                    words_per_scan = (my_dy >> 4) / dx;  \
                else    \
                    words_per_scan = (my_dy >> 4);  \
            }    \
            else    \
                words_per_scan = 1;  \
            \
            drawing_time = words_per_scan * (dx + 1);    \
            \
            /* multiply by the write cycle time (includes refresh) */    \
            drawing_time *= 55;  \
            \
            /* add in the inter-scanline time */    \
            drawing_time += (dx * 370);  \
            \
            /* allow for startup and ending latentcy in the VG2 */    \
            drawing_time += 500;  \
            \
            /* add register load time */    \
            drawing_time += 1300;    \
```

```
                            \
        /* bring up to minimal setup and load time */   \
        if (drawing_time < 2750)      \
        drawing_time = 2750;       \
            }    \
        }   \
    }
endif /*------------------------------------------------------------------------*
 *  W E I G H _ C E L L _ T I M E:
 *      This macro is used by the cell array code to get the drawing time
 *      for a single cell.
 *------------------------------------------------------------------------*/
#ifdef AQ_CELL_TIME
#define WEIGH_CELL_TIME(dx, dy, setup_time, per_cell_time)   \
    /* s_long dx, dy;         */ \
    /* u_long setup_time;     */ \
    /* u_long per_cell_time;  */ \
    {    \
    extern bool gr_do_timing;    \
     \
    /* is autoquality turned on? */ \
    if (gr_do_timing)    \
        {    \
        /* get the number of word writes */   \
        per_cell_time = ((dy >> 4) + 1) * (dx + 1);    \
         \
        /* multiply by the write cycle time (includes refresh) */   \
        per_cell_time *= 55;    \
         \
        /* allow for latentcy in the VG2 and register load time */   \
        setup_time = 450 + 940;  \
        }    \
    }
endif /*------------------------------------------------------------------------*
 *  W E I G H _ C E L L _ T I M E _ R G B:
 *      This macro is used by the RGB cell array code to get the drawing time
 *      for a single cell.
 *------------------------------------------------------------------------*/
#ifdef AQ_CELL_TIME_RGB
#define WEIGH_CELL_TIME_RGB(dx, dy, setup_time, per_cell_time)   \
    /* s_long dx, dy;         */ \
    /* u_long setup_time;     */ \
    /* u_long per_cell_time;  */ \
    {    \
    extern bool gr_do_timing;    \
     \
    /* is autoquality turned on? */ \
    if (gr_do_timing)    \
        {    \
        /* get the number of word writes */   \
        per_cell_time = ((dy >> 4) + 1) * (dx + 1);    \
         \
        /* multiply by the write cycle time (includes refresh) */   \
        per_cell_time *= 55;    \
         \
        /* allow for latentcy in the VG2 and register load time */   \
        setup_time = 450 + 940;  \
        }    \
    }
endif /*------------------------------------------------------------------------*
 *  W E I G H _ S C A N _ T I M E:
 *      This macro is used by the scan row code to get the drawing time
 *      for a single row.
 *------------------------------------------------------------------------*/
#ifdef AQ_SCAN_TIME
#define WEIGH_SCAN_TIME(setup_time, per_cell_time)   \
    /* u_long setup_time;     */ \
```

```
        /* u_long per_cell_time; */ \
    {   \
        extern bool gr_do_timing;   \
        \
        /* is autoquality turned on? */ \
        if (gr_do_timing)   \
            {   \
            /* get the number of word writes -- each pixel, so 1 */  \
            per_cell_time = 1;  \
            \
            /* multiply by the write cycle time (includes refresh) */  \
            per_cell_time *= 55;    \
            \
            /* allow for latentcy in the VG2 and register load time */ \
            setup_time = 450 + 940; \
            }   \
    }
endif /*------------------------------------------------------------------------*
 *  W E I G H _ S C A N _ T I M E _ R G B:
 *      This macro is used by the RGB run length code to get the drawing time
 *      for a single run.
 *------------------------------------------------------------------------*/
#ifdef AQ_SCAN_TIME_RGB
#define WEIGH_SCAN_TIME_RGB(setup_time, per_cell_time) \
        /* u_long setup_time;    */ \
        /* u_long per_cell_time; */ \
    {   \
        extern bool gr_do_timing;   \
        \
        /* is autoquality turned on? */ \
        if (gr_do_timing)   \
            {   \
            /* get the number of word writes -- each pixel, so 1 */  \
            per_cell_time = 1;  \
            \
            /* multiply by the write cycle time (includes refresh) */  \
            per_cell_time *= 55;    \
            \
            /* allow for latentcy in the VG2 and register load time */ \
            setup_time = 450 + 940; \
            }   \
    }
endif /*------------------------------------------------------------------------*
 *  W E I G H _ C E L L _ C O L O R:
 *      This macro is used by the cell array code to add the drawing time
 *      for each cell to the appropriate toner passes.
 *------------------------------------------------------------------------*/
#ifdef AQ_CELL_COLOR
#define WEIGH_CELL_COLOR(setup_time, per_cell_time, num_cells, color, bin_num) \
        /* u_long  setup_time;     */ \
        /* u_long  per_cell_time;  */ \
        /* u_short num_cells;      */ \
        /* u_short color;          */ \
        /* u_short bin_num;        */ \
    {   \
        extern bin_struct *gr_bin_table;    /* pointer to array of sort bins */ \
        extern bool       gr_opaque;        /* current opaque status */ \
        extern bool gr_do_timing;   \
        bin_struct  *curr_bin;              /* pointer to current bin struct */ \
        u_short i;  \
        u_long time;    \
        u_short per_cell_short; \
        \
        /* is autoquality turned on? */ \
        if (gr_do_timing)   \
            {   \
            curr_bin = &(gr_bin_table[bin_num]);    \
            per_cell_short = per_cell_time; \
```

```
            \
    /* get time for this number of cells */ \
    if (num_cells > 1) \
    {    \
        if (per_cell_time < 65535) \
            time = setup_time + (per_cell_short * num_cells);    \
        else    \
            time = setup_time + (per_cell_time * num_cells);    \
    }    \
    else    \
        time = setup_time + per_cell_time;    \
    \
    /* bring up to minimal setup and load time */    \
    if (time < 1500) /* test. was 2200 */    \
        time = 1500;    \
    \
    if (gr_opaque)    \
    {    \
        curr_bin->drawing_time[0] += time;    \
        curr_bin->drawing_time[1] += time;    \
        curr_bin->drawing_time[2] += time;    \
        curr_bin->drawing_time[3] += time;    \
    }    \
    else    \
    {    \
        if (gr_color_toners[color] & BLACK_TONER) \
            curr_bin->drawing_time[0] += time;    \
        else    \
            curr_bin->drawing_time[0] += THROW_AWAY_TIME;    \
    \
        if (gr_color_toners[color] & CYAN_TONER) \
            curr_bin->drawing_time[1] += time;    \
        else    \
            curr_bin->drawing_time[1] += THROW_AWAY_TIME;    \
    \
        if (gr_color_toners[color] & RED_TONER) \
            curr_bin->drawing_time[2] += time;    \
        else    \
            curr_bin->drawing_time[2] += THROW_AWAY_TIME;    \
    \
        if (gr_color_toners[color] & YELLOW_TONER) \
            curr_bin->drawing_time[3] += time;    \
        else    \
            curr_bin->drawing_time[3] += THROW_AWAY_TIME;    \
    }    \
}    \
}
endif /*---------------------------------------------------------------------*
 *  W E I G H _ C E L L _ R G B:
 *      This macro is used by the RGB cell array code to add the drawing time
 *      for each cell to the appropriate toner passes.
 *---------------------------------------------------------------------*/
#ifdef AQ_CELL_RGB
#define WEIGH_CELL_RGB(setup_time, per_cell_time, num_cells, toners, bin_num) \
    /* u_long  setup_time;    */ \
    /* u_long  per_cell_time; */ \
    /* u_short num_cells;     */ \
    /* u_short toners[4];     */    \
    /* u_short bin_num;       */ \
{    \
    extern bin_struct *gr_bin_table;    /* pointer to array of sort bins */ \
    extern bool    gr_opaque;           /* current opaque status */ \
    extern bool gr_do_timing;    \
    bin_struct *curr_bin;               /* pointer to current bin struct */ \
    u_short i;    \
    u_long time;    \
    u_short per_cell_short;    \
    \
    /* is autoquality turned on? */ \
    if (gr_do_timing)    \
```

```
            {   \
            curr_bin = &(gr_bin_table[bin_num]);    \
            per_cell_short = per_cell_time;  \
            \
            /* get time for this number of cells */  \
            if (num_cells > 1)  \
                {   \
                if (per_cell_time < 65535)  \
                    time = setup_time + (per_cell_short * num_cells);   \
                else    \
                    time = setup_time + (per_cell_time * num_cells);    \
                }   \
            else    \
                time = setup_time + per_cell_time;  \
        \
        /* bring up to minimal setup and load time */   \
        if (time < 1700)    \
            time = 1700;    \
        \
        if (gr_opaque)  \
            {   \
            curr_bin->drawing_time[0] += time;  \
            curr_bin->drawing_time[1] += time;  \
            curr_bin->drawing_time[2] += time;  \
            curr_bin->drawing_time[3] += time;  \
            }   \
        else    \
            {   \
            if (toners[0] != -1)    \
                curr_bin->drawing_time[0] += time;  \
            else    \
                curr_bin->drawing_time[0] += RGB_THROW_AWAY_TIME;   \
            \
            if (toners[1] != -1)    \
                curr_bin->drawing_time[1] += time;  \
            else    \
                curr_bin->drawing_time[1] += RGB_THROW_AWAY_TIME;   \
            \
            if (toners[2] != -1)    \
                curr_bin->drawing_time[2] += time;  \
            else    \
                curr_bin->drawing_time[2] += RGB_THROW_AWAY_TIME;   \
            \
            if (toners[3] != -1)    \
                curr_bin->drawing_time[3] += time;  \
            else    \
                curr_bin->drawing_time[3] += RGB_THROW_AWAY_TIME;   \
            }   \
        }   \
    }
endif /*----------------------------------------------------------------------*
 *  W E I G H _ C M Y K _ R A S T E R ( ):
 *      This macro is used by the CMYK raster code to weigh that thing.
 *----------------------------------------------------------------------*/
#ifdef AQ_CMYK_RASTER
#define WEIGH_CMYK_RASTER(last_time, last_length, this_time, this_length)   \
    /* u_long last_time;    */  \
    /* u_long last_length;  */  \
    /* u_long this_time;    */  \
    /* u_long this_length;  */  \
    {   \
    extern bool gr_do_timing;   \
    \
    /* is autoquality turned on? */ \
    if (gr_do_timing)   \
        {   \
        if (this_length == last_length) \
            this_time = last_time;  \
        else    \
            {   \
            this_time = this_length * 175;  \
```

```
            last_time = this_time;  \
            last_length = this_length;  \
            }  \
        }  \
    }
endif /*----------------------------------------------------------------*
 *  W E I G H _ C M Y K _ T O N E R S ( ):
 *      This macro is used by the CMYK raster code to add the drawing time
 *      to the appropriate toner passes.
 *----------------------------------------------------------------*/
#ifdef AQ_CMYK_TONERS
#define WEIGH_CMYK_TONERS(this_time, flags, band_num)  \
    /* u_long this_time; */ \
    /* u_short flags; */   \
    /* u_long band_num; */ \
    {   \
    extern bin_struct  *gr_bin_table;   /* pointer to array of sort bins */ \
    extern bool        gr_opaque;       /* current opaque status */ \
    extern bool gr_do_timing;  \
    \
    /* is autoquality turned on? */ \
    if (gr_do_timing)   \
        {   \
        if (gr_opaque)  \
            {   \
            gr_bin_table[band_num].drawing_time[0] += this_time;  \
            gr_bin_table[band_num].drawing_time[1] += this_time;  \
            gr_bin_table[band_num].drawing_time[2] += this_time;  \
            gr_bin_table[band_num].drawing_time[3] += this_time;  \
            }   \
        else    \
            {   \
            if (flags & 0x0001) \
                /* black */ \
                gr_bin_table[band_num].drawing_time[0] += this_time;   \
            if (flags & 0x0002) \
                /* cyan */  \
                gr_bin_table[band_num].drawing_time[1] += this_time;   \
            if (flags & 0x0004) \
                /* magenta */   \
                gr_bin_table[band_num].drawing_time[2] += this_time;   \
            if (flags & 0x0008) \
                /* yellow */    \
                gr_bin_table[band_num].drawing_time[3] += this_time;   \
            }   \
        }   \
    }
endif /*----------------------------------------------------------------*
 *  W E I G H _ R S T A M P ( ):
 *  This is the AutoQuality macro for determining the time required to
 *  draw a raster stamp.
 *----------------------------------------------------------------*/
#ifdef AQ_RSTAMP
#define WEIGH_RSTAMP(x, y, x_high, y_high, time)  \
    /* s_long x, y, x_high, y_high; */ \
    /* u_long time; */, \
    {   \
    /* get the number of word writes per scanline */  \
    time = ((y_high >> 4) - (y >> 4) + 1);  \
    \
    /* get the total number of word writes */  \
    time *= ((x_high - x) + 1);  \
    \
    /* multiply by the write cycle time (includes refresh) */  \
    time *= 150;  \
    \
    /* allow for startup and ending latentcy in the VG2 */  \
    time += 450;  \
```

```
    \
    /* add register load time */   \
    time += 940;   \
    \
    /* bring up to minimal setup and load time */   \
    if (time < 2200)   \
        time = 2200;   \
    }
endif /*----------------------------------------------------------------*
 *      C I R C L E   M A C R O S
 *   The following macros are for use with gr_draw_circle()
 *----------------------------------------------------------------*/
#ifdef AQ_CIRCLES
#define MAX(a,b)  (((a) > (b)) ? (a) : (b))
#define MIN(a,b)  (((a) < (b)) ? (a) : (b))

#define WEIGH_FVIS_FILL_CIRC(radius, time)   \
    {   \
    extern bool gr_do_timing;   \
    \
    if (gr_do_timing)   \
        {   \
        switch (radius)   \
            {   \
            case 2:   \
                time = 11400;   \
                break;   \
            case 3:   \
                time = 16200;   \
                break;   \
            case 4:   \
                time = 21000;   \
                break;   \
            case 5:   \
                time = 21000;   \
                break;   \
            default:   \
                time = radius * 3800;   \
                break;   \
            }   \
        }   \
    } define WEIGH_PVIS_FILL_CIRC(Xmin, Xmax, curr_band, time)   \
    {   \
    extern bool gr_do_timing;   \
    extern u_short gr_log_nscan;   \
    \
    if (gr_do_timing)   \
        {   \
        u_long PVradius;   \
        PVradius = (MIN(Xmax, ((curr_band+1) << gr_log_nscan))   \
                 -  MAX(Xmin, (curr_band << gr_log_nscan)) >> 1);   \
        \
        switch (PVradius)   \
            {   \
            case 2:   \
                time = 17000;   \
                break;   \
            case 3:   \
                time = 19000;   \
                break;   \
            case 4:   \
                time = 21000;   \
                break;   \
            case 5:   \
                time = 23000;   \
                break;   \
            default:   \
                time = PVradius * 4500;   \
```

```
                break;  \
            }           \
        }       \
    } define WEIGH_FVIS_HOLL_CIRC(radius, outln_wdth, time)   \
    {   \
        extern bool gr_do_timing;   \
        \
        if (gr_do_timing)   \
            {   \
            time = (radius * 8934) * outln_wdth;    \
            }   \
    } define WEIGH_PVIS_HOLL_CIRC(Xmin, Xmax, outln_wdth, curr_band, time)   \
    {   \
        extern bool gr_do_timing;   \
        extern u_short gr_log_nscan;    \
        \
        if (gr_do_timing)   \
            {   \
            u_long PVradius;    \
            PVradius = (MIN(Xmax, ((curr_band+1) << gr_log_nscan))  \
                    - MAX(Xmin, (curr_band << gr_log_nscan)) >> 1); \
            \
            time = (PVradius * 8934) * outln_wdth;  \
            }   \
    }
endif
/*---------------------------------END CIRCLE MACROS--------------------------*/
/*---------------------         ---------------------------------------------*
 *      M U L T I - W I D T H    L I N E    M A C R O S
 *  The following macros are for use with gr_draw_multi();
 *---------------------------------------------------------------------------*/ ifdef AQ_MULTI
/*---------------------------------------------------------------------------*
 *  W E I G H _ M W _ Y O N L Y:
 *      This is the macro that is used to determine the drawing time for
 *      y-only multi-width lines.
 *---------------------------------------------------------------------------*/
#define WEIGH_MW_YONLY(ymin, ymax, dx, drawing_time)    \
    /* s_long ymin, ymax, dx; */    \
    /* u_long drawing_time;    */   \
    {   \
        extern bool gr_do_timing;   \
        \
        /* is autoquality turned on? */ \
        if (gr_do_timing)   \
            {   \
            /* get the number of word writes */ \
            drawing_time = ((ymax >> 4) - (ymin >> 4) + 1) * (dx + 1);   \
            \
            /* multiply by the write cycle time (includes refresh) */   \
            drawing_time *= 55; \
            \
            /* allow for startup and ending latentcy in the VG2 */  \
            drawing_time += 450;    \
            \
            /* add register load time */    \
            drawing_time += 940;    \
            \
            /* bring up to minimal setup and load time */   \
            if (drawing_time < 2200)    \
                drawing_time = 2200;    \
            }   \
    }

/*---------------------------------------------------------------------------*
```

```
 * WEIGH_MW_XONLY:
 *      This is the macro that is used to determine the drawing time for
 *      x-only multi-width lines.
 *-----------------------------------------------------------------------*/
#define WEIGH_MW_XONLY(ymin, ymax, dx, drawing_time)   \
    /* s_long ymin, ymax, dx; */    \
    /* u_long drawing_time;   */    \
    {   \
    extern bool gr_do_timing;   \
    \
    /* is autoquality turned on? */ \
    if (gr_do_timing)   \
        {   \
        /* get the number of word writes */   \
        drawing_time = ((ymax >> 4) - (ymin >> 4) + 1) * (dx + 1);   \
        \
        /* multiply by the write cycle time (includes refresh) */   \
        drawing_time *= 55;  \
        \
        /* allow for startup and ending latentcy in the VG2 */  \
        drawing_time  · 450;  \
        \
        /* add register load time */   \
        drawing_time += 940;   \
        \
        /* bring up to minimal setup and load time */   \
        if (drawing_time < 2200)   \
            drawing_time = 2200;   \
        }   \
    }

/*-----------------------------------------------------------------------*
 * WEIGH_MW_TOP:
 *      This is the macro that is used to determine the drawing time for
 *      multi-width lines which do not cross bands.
 *-----------------------------------------------------------------------*/
#define WEIGH_MW_TOP(fv_top,x1,x2,x3,x4,dx,dy,dx_width,dy_width,dy_chord,time)\
    /* u_byte vis; */   \
    /* s_long x1,x2,x3,x4,dx,dy,dx_width,dy_width; */   \
    /* s_long *dy_chord; */ \
    /* u_long *time; */ \
    {   \
    extern bool gr_do_timing;   \
    extern void weigh_mw_top();  \
    \
    /* is autoquality turned on? */ \
    if (gr_do_timing)   \
        {   \
        weigh_mw_top(fv_top,x1,x2,x3,x4,dx,dy,dx_width,dy_width,dy_chord,time);\
        }   \
    }

/*-----------------------------------------------------------------------*
 * WEIGH_MW_MIDDLE:
 *      This is the macro that is used to determine the drawing time for
 *      multi-width lines which cross a band in their "middle" section.
 *-----------------------------------------------------------------------*/
#define WEIGH_MW_MIDDLE(fv_mid,x_low,x3,x4,dx,dy,dx_width,dy_width,dy_chord,time
    /* u_byte vis; */   \
    /* s_long startx, x3, x4; */    \
    /* s_long dx, dy; */    \
    /* s_long dx_width; */  \
    /* s_long dy_width; */  \
    /* s_long dy_chord; */  \
    /* u_long *time; */ \
    {   \
    extern bool gr_do_timing;   \
    extern void weigh_mw_middle();  \
    \
    /* is autoquality turned on? */ \
    if (gr_do_timing)   \
        {   \
```

```
        weigh_mw_middle(fv_mid, x_low, x3, x4, dx, dy, dx_width, \
                    dy_width, dy_chord, time); \
        } \
    } endif
/*----------------------------------------------------------------------*
 * Copyright (c) 1988 by Versatec, Inc.  All rights reserved.
 *
 * gr_autoquality.c         Automatic Plot Quality Control
 *                          written by Robert Crowe    13 September 1988
 *
 * This file contains the routine gr_autoquality, which takes the timing
 * information gathered during parsing and determines the proper mode of
 * assuring plot quality.  Plot quality relates to the fact that if the
 * paper motion should stop at any time after plotting is started, a toner
 * bar is created where toner washes over the paper for too long a period.
 * There are three ways to avoid this:
 *
 *      1.  Drive the plotter at full speed for the entire plot while
 *          rasterizing on the fly.
 *
 *      2.  Slow the plotter down enough so that the paper never stops.
 *
 *      3.  Spool raster to disk so that we can drive the plotter at full
 *          speed for the entire plot.
 *
 * This routine looks at the timing information for the plot and decides
 * whether to spool or to send speed control to the plotter if it finds
 * that we cannot drive the plotter at full speed while rasterizing on
 * the fly.
 *
 * Revision History:
 * 11/04/88      RTC Added multi-width line support.
 *  1/27/89      RTC Eliminated 1/4 ips when we can spool, and added copies
 *  2/03/89      RTC Tuned extra paper movement
 *  4/11/89      RTC Fixed monochrome problem
 *----------------------------------------------------------------------*/
static char *sc_gr_config="%G %W";
#include "std_types.h"
#include "ctl_mv_tank.h"
#include "gr_outqueue.h"
#include "scsi_ext.h"
#include "gr_attrs.h"

#define AQ_RECT
#define AQ_SW_XONLY
#define AQ_SW_YONLY
#define AQ_SW
#define AQ_TRAP
#include "gr_autoquality.h"

#include "gr_phrase.h"

define DISK_SPEED    307200.0      /* average Kb spooling rate */ define NANO_FACTOR 100000000.0     /* to convert 10 nanoseconds to seconds */ define BAND_SWITCH_TIME   2500000  /* 25 milli-- disk seek */ define NUM_SPEEDS 9                /* the number of speed selections */ define EXTRA_PAPER 23              /* extra paper at the ends of the plot */
                                    /* this actually ranges from 20 for the */
                                    /* black to 25 for the red on a ce3236 */
extern scsi_drive_struct  scsi_drive;/* the disk drive descriptor */
extern u_short      gr_num_bins;    /* number of sort bins */
extern strm_struct *gr_bin_stream;  /* pointer to array of bin streams */
extern bin_struct  *gr_bin_table;   /* pointer to array of bin descriptors */
extern s_short      gr_max_bin;     /* highest sort bin used */
extern u_long       gr_job_nscan;   /* the number of scan lines in a band */
extern u_long       gr_plotter_iscan;   /* number of bytes per scanline */
extern bool         gr_time_went_negative;  /* overflow indicator */
extern s_long       gr_AQ_max_rect_scan_words;
extern s_long       gr_AQ_max_rect_dx;
```

```
extern  u_long      *gr_AQ_rect_table[MAX_RECT_SCAN_WORDS];
extern  s_long      gr_AQ_max_xonly;
extern  u_long      *gr_AQ_xonly_table;
extern  s_long      gr_AQ_max_yonly;
extern  u_long      *gr_AQ_yonly_table;
extern  s_long      gr_AQ_max_snglw_dx;
extern  s_long      gr_AQ_max_snglw_dy;
extern  u_long      *gr_AQ_snglw_table[MAX_SNGLW_DX];
extern  s_long      gr_AQ_max_trap_dx;
extern  s_long      gr_AQ_max_trap_dy;
extern  u_long      *gr_AQ_trap_table[MAX_TRAP_DX];
extern u_long grCMYlasttime, grCMYlastlength, grCMYthistime, grCMYthislength;

/* the range of plotter speeds currently supported */
static float plotter_speeds[] =
    {
    0.125, 0.25, 0.50, 0.75, 1.00, 1.25, 1.50, 1.75, 2.50
    };

/*-----------------------------------------------------------------*
 * G R _ A U T O Q U A L I T Y ( ):
 *     The aforesaid routine.
 *-----------------------------------------------------------------*/
/* void gr_autoquality(job) */
void gr_autoquality(job)
register outq_struct *job;
    {
    register u_short i;
    register s_short max_bin;
    u_long max_black, max_cyan, max_magenta, max_yellow;
    u_long bytes_per_band;
    u_short z;
    float band_inches, plot_inches;
    float max_black_ips, max_cyan_ips, max_magenta_ips, max_yellow_ips;
    float max_speed, max_black_float, max_cyan_float, max_magenta_float,
          max_yellow_float;

double pass_spool_time;
    double black_spool_time, cyan_spool_time, red_spool_time, yellow_spool_time;
    double black_draw_time, cyan_draw_time, red_draw_time, yellow_draw_time;
    double speed_time;

/*---------------------------*
     * Initialize to no spooling
     *---------------------------*/
    if (job->raster_spool == AUTO_SPOOL)
        {
        job->pass_spool[0] = FALSE;
        job->pass_spool[1] = FALSE;
        job->pass_spool[2] = FALSE;
        job->pass_spool[3] = FALSE;
        }

/*-----------------------------*
     * Initialise to full speed.
     *-----------------------------*/
    if (job->job_speed == AUTOSPEED)
        {
        job->pass_speed[0] = FULL_SPEED;
        job->pass_speed[1] = FULL_SPEED;
        job->pass_speed[2] = FULL_SPEED;
        job->pass_speed[3] = FULL_SPEED;
        }

/*---------------------*
     * Look for overflow
     *---------------------*/
    if (gr_time_went_negative)
        {
        if (job->raster_spool == AUTO_SPOOL)
            {
            job->pass_spool[0] = TRUE;
            job->pass_spool[1] = TRUE;
```

```c
                job->pass_spool[2] = TRUE;
                job->pass_spool[3] = TRUE;
                }
            else
                {
                job->pass_speed[0] = 1;
                job->pass_speed[1] = 1;
                job->pass_speed[2] = 1;
                job->pass_speed[3] = 1;
                }

/* if we got overflow, we're done */
            return;
            }

/*-----------------------------------------------*
     * Get slowest band for each pass of this plot.
     * We don't care how long the first one takes!
     *-----------------------------------------------*/
    max_black = 0;
    max_cyan = 0;
    max_magenta = 0;
    max_yellow = 0;
    black_draw_time = 0;
    cyan_draw_time = 0;
    red_draw_time = 0;
    yellow_draw_time = 0;
    max_bin = gr_max_bin;

for (i=1; i <= max_bin; i++)
        {
        black_draw_time  += gr_bin_table[i].drawing_time[0];
        cyan_draw_time   += gr_bin_table[i].drawing_time[1];
        red_draw_time    += gr_bin_table[i].drawing_time[2];
        yellow_draw_time += gr_bin_table[i].drawing_time[3];
        if (gr_bin_table[i].drawing_time[0] > max_black)
            max_black = gr_bin_table[i].drawing_time[ ;
        if (gr_bin_table[i].drawing_time[1] > max_cyan)
            max_cyan = gr_bin_table[i].drawing_time[1];
        if (gr_bin_table[i].drawing_time[2] > max_magenta)
            max_magenta = gr_bin_table[i].drawing_time[2];
        if (gr_bin_table[i].drawing_time[3] > max_yellow)
            max_yellow = gr_bin_table[i].drawing_time[3];
        }

/* look for null plot */
    if (!(max_black | max_cyan | max_magenta | max_yellow))
        return;

/*-----------------------------------*
     * Add in the band switch time
     *-----------------------------------*/
    max_black   += BAND_SWITCH_TIME;
    max_cyan    += BAND_SWITCH_TIME;
    max_magenta += BAND_SWITCH_TIME;
    max_yellow  += BAND_SWITCH_TIME;

/*-----------------------------*
     * Convert this to ips
     *-----------------------------*/
    max_black_float   = (float)max_black;
    max_cyan_float    = (float)max_cyan;
    max_magenta_float = (float)max_magenta;
    max_yellow_float  = (float)max_yellow;

band_inches= (float)(((float)gr_job_nscan) / ((float)job->plotter_density));
    plot_inches = band_inches * (max_bin + 1);   /* this is the drawn area */

/* multiple copies ? -- drawn area only */
    if ((job->copy_count > 1) && (job->post_space > 0))
        {
        /* multiply the plot length by the number of plots */
        plot_inches *= job->copy_count;
```

```
    /* add the spacing to the overall plot length */
    plot_inches += ((job->int_space * (job->copy_count - 1)) /
                    job->plotter_density);
}

/* add extra paper movement at the ends of the plot */
plot_inches += EXTRA_PAPER;

if (max_black)
    max_black_ips = band_inches / (max_black_float / NANO_FACTOR);
else
    max_black_ips = 0;

if (max_cyan)
    max_cyan_ips = band_inches / (max_cyan_float / NANO_FACTOR);
else
    max_cyan_ips = 0;

if (max_magenta)
    max_magenta_ips = band_inches / (max_magenta_float / NANO_FACTOR);
else
    max_magenta_ips = 0;

if (max_yellow)
    max_yellow_ips = band_inches / (max_yellow_float / NANO_FACTOR);
else
    max_yellow_ips = 0;

/*---------------------------*
 *  Find the spooling time
 *---------------------------*/
max_speed = job->model.max_ips;

bytes_per_band = gr_plotter_iscan * gr_job_nscan;
/* time to write to disk */
pass_spool_time = (bytes_per_band * (max_bin + 1)) / DISK_SPEED;
/* time to output at full speed */
pass_spool_time += (plot_inches / max_speed);

/*-----------------------------------------------------------*
 *  Add the spooling time to each pass's total drawing time
 *-----------------------------------------------------------*/
black_spool_time = (black_draw_time / NANO_FACTOR) + pass_spool_time;
cyan_spool_time = (cyan_draw_time / NANO_FACTOR) + pass_spool_time;
red_spool_time = (red_draw_time / NANO_FACTOR) + pass_spool_time;
yellow_spool_time = (yellow_draw_time / NANO_FACTOR) + pass_spool_time;

/*-----------------------------------------------------------*
 *  The first pass can take advantage of the tick-mark time
 *  to spool up raster early, so subtract that time.
 *  (Remembering that Aurora has merge tick mark mode.)
 *-----------------------------------------------------------*/
if ( job->npass > 1 && ( job->model.type == TICK_MARK_COLOR ||
    (job->model.type == AURORA && job->merge_ticks==0) ) )
    {
    if (job->toner[0] == T_BLACK)
        black_spool_time -= (plot_inches / max_speed);
    else
        {
        if (job->toner[0] == T_CYAN)
            cyan_spool_time -= (plot_inches / max_speed);
        else
            {
            if (job->toner[0] == T_MAGENTA)
                red_spool_time -= (plot_inches / max_speed);
            else
                yellow_spool_time -= (plot_inches / max_speed);
            }
        }
    }

/*---------------------------*
 *  Find the right speed
 *---------------------------*/
```

```
/* BLACK PASS */
if ((max_black_ips < max_speed) && (max_black_ips))
    {
    if (job->job_speed == AUTOSPEED)
        {
        for (i=1; i < NUM_SPEEDS; i++)
            {
            if (plotter_speeds[i] > max_black_ips)
                {
                for (z=0; z < MAX_PASS; ++z)
                    {
                    if (job->toner[z] == T_BLACK)
                        {
                        job->pass_speed[z] = i - 1;
                        break;
                        }
                    }
                break;
                }
            } speed_time = plot_inches / plotter_speeds[job->pass_speed[0]];
        } if (job->raster_spool == AUTO_SPOOL)
        {
        if (job->job_speed == AUTOSPEED)
            {
            if ((plotter_speeds[1] > max_black_ips) ||
                (job->pass_speed[0] == 1) ||
                (speed_time > black_spool_time))
                {
                for (z=0; z < MAX_PASS; ++z)
                    {
                    if (job->toner[z] == T_BLACK)
                        {
                        job->pass_spool[z] = TRUE;
                        break;
                        }
                    }
                }
            }
        else
            {
            for (z=0; z < MAX_PASS; ++z)
                {
                if (job->toner[z] == T_BLACK)
                    {
                    job->pass_spool[z] = TRUE;
                    break;
                    }
                }
            }
        }
    }

/* CYAN PASS */
if ((max_cyan_ips < max_speed) && (max_cyan_ips))
    {
    if (job->job_speed == AUTOSPEED)
        {
        for (i=1; i < NUM_SPEEDS; i++)
            {
            if (plotter_speeds[i] > max_cyan_ips)
                {
                for (z=0; z < MAX_PASS; ++z)
                    {
                    if (job->toner[z] == T_CYAN)
                        {
                        job->pass_speed[z] = i - 1;
                        break;
                        }
                    }
```

```
                break;
                }
            }
        speed_time = plot_inches / plotter_speeds[job->pass_speed[1]];
        } if (job->raster_spool == AUTO_SPOOL)
        {
        if (job->job_speed == AUTOSPEED)
            {
            if ((plotter_speeds[1] > max_cyan_ips) ||
                (job->pass_speed[1] == 1) ||
                (speed_time > cyan_spool_time))
                {
                for (z=0; z < MAX_PASS; ++z)
                    {
                    if (job->toner[z] == T_CYAN)
                        {
                        job->pass_spool[z] = TRUE;
                        break;
                        }
                    }
                }
            }
        else
            {
            for (z=0; z < MAX_PASS; ++z)
                {
                if (job->toner[z] == T_CYAN)
                    {
                    job->pass_spool[z] = TRUE;
                    break;
                    }
                }
            }
        }
    }

/* MAGENTA PASS */
if ((max_magenta_ips < max_speed) && (max_magenta_ips))
    {
    if (job->job_speed == AUTOSPEED)
        {
        for (i=1; i < NUM_SPEEDS; i++)
            {
            if (plotter_speeds[i] > max_magenta_ips)
                {
                for (z=0; z < MAX_PASS; ++z)
                    {
                    if (job->toner[z] == T_MAGENTA)
                        {
                        job->pass_speed[z] = i - 1;
                        break;
                        }
                    }
                break;
                }
            } speed_time = plot_inches / plotter_speeds[job->pass_speed[2]];
        } if (job->raster_spool == AUTO_SPOOL)
        {
        if (job->job_speed == AUTOSPEED)
            {
            if ((plotter_speeds[1] > max_magenta_ips) ||
                (job->pass_speed[2] == 1) ||
                (speed_time > red_spool_time))
                {
                for (z=0; z < MAX_PASS; ++z)
                    {
                    if (job->toner[z] == T_MAGENTA)
```

```c
                        {
                        job->pass_spool[z] = TRUE;
                        break;
                        }
                    }
                }
            else
                {
                for (z=0; z < MAX_PASS; ++z)
                    {
                    if (job->toner[z] == T_MAGENTA)
                        {
                        job->pass_spool[z] = TRUE;
                        break;
                        }
                    }
                }
            }
        }

/* YELLOW PASS */
if ((max_yellow_ips < max_speed) && (max_yellow_ips))
    {
    if (job->job_speed == AUTOSPEED)
        {
        for (i=1; i < NUM_SPEEDS; i++)
            {
            if (plotter_speeds[i] > max_yellow_ips)
                {
                for (z=0; z < MAX_PASS; ++z)
                    {
                    if (job->toner[z] == T_YELLOW)
                        {
                        job->pass_speed[z] = i - 1;
                        break;
                        }
                    }
                break;
                }
            } speed_time = plot_inches / plotter_speeds[job->pass_speed[3]];
        } if (job->raster_spool == AUTO_SPOOL)
        {
        if (job->job_speed == AUTOSPEED)
            {
            if ((plotter_speeds[1] > max_yellow_ips) ||
                (job->pass_speed[3] == 1) ||
                (speed_time > yellow_spool_time))
                {
                for (z=0; z < MAX_PASS; ++z)
                    {
                    if (job->toner[z] == T_YELLOW)
                        {
                        job->pass_spool[z] = TRUE;
                        break;
                        }
                    }
                }
            }
        else
            {
            for (z=0; z < MAX_PASS; ++z)
                {
                if (job->toner[z] == T_YELLOW)
                    {
                    job->pass_spool[z] = TRUE;
                    break;
                    }
                }
            }
```

```
            }
        }
    }

/*----------------------------------------------------------------*
 *  W E I G H _ C O R N E R:
 *      This function assumes a triangle is being drawn.
 *----------------------------------------------------------------*/
#define WEIGH_CORNER(vis, dx_width, dy_chord, drawing_time) \
    /* u_byte vis; */    \
    /* s_short dx_width, dy_chord; */  \
    /* u_long *drawing_time; */     \
    {  \
    s_short scan_words;    \
    u_long local_time;  \
    s_short inter_scan; \
    s_short dy_local;  \
     \
    /* be careful with negatives */ \
    if (dy_chord < 0)   \
        dy_local = -dy_chord;  \
    else  \
        dy_local = dy_chord;   \
    if (dx_width < 0)   \
        dx_width = -dx_width;  \
     \
    /* get the number of ord writes */    \
    scan_words = (dy_local >> 4) + 1;    \
     \
    /* get the time for Y writes on each scanline */   \
    if (vis & FULL) \
        local_time = (scan_words >> 1) * 55;    \
    else  \
        local_time = scan_words * 55;  \
     \
    /* find the inter-scanline time */ \
    inter_scan = 370 - local_time;  \
    if (inter_scan < 150)   \
        inter_scan = 150;  \
     \
    /* get the total for Y writes */    \
    local_time *= (dx_width + 1);  \
     \
    /* add in the inter-scanline time */    \
    local_time += (dx_width * inter_scan);  \
     \
    /* allow for startup and ending latentcy in the VG2 */    \
    local_time += 500;  \
     \
    /* add in the local time to the total time */   \
    *drawing_time += local_time;   \
    }

/*----------------------------------------------------------------*
 *  W E I G H _ M I D D L E:
 *      This function gets the time for a parallelogram.
 *----------------------------------------------------------------*/
#define WEIGH_MIDDLE(vis, dy, dx_middle, dy_chord, drawing_time)    \
    /* u_byte vis; */   \
    /* s_long dy; */   \
    /* s_short dx_middle, dy_chord; */ \
    /* u_long *drawing_time; */ \
    {  \
    s_short scan_words; \
    u_long local_time; \
    s_short inter_scan; \
    s_short dx_local;   \
    s_short dy_local;   \
     \
    /* be careful with negatives */ \
    if (dy_chord < 0)   \
```

```
            dy_local = -dy_chord;      \
    else                               \
            dy_local = dy_chord;       \
    if (dx_middle < 0)                 \
            dx_local = -dx_middle;     \
    else                               \
            dx_local = dx_middle;      \
    if (dy < 0)                        \
            dy = -dy;                  \
                                       \
    /* get the number of word writes */ \
    if (vis & FULL)                    \
            scan_words = (dy_local >> 4) + 1;     \
    else                               \
            scan_words = ((d_local + dy) >> 4) + 1;   \
                                       \
    /* get the time for Y writes on each scanline */  \
    local_time = scan_words * 55;      \
                                       \
    /* find the inter-scanline time */ \
    inter_scan = 370 - local_time;     \
    if (inter_scan < 150)              \
            inter_scan = 150;          \
                                       \
    /* get the total for Y writes */   \
    local_time *= (dx_local + 1);      \
                                       \
    /* add in the inter-scanline time */  \
    local_time += (dx_local * inter_scan);   \
                                       \
    /* allow for startup and ending latentcy in the VG2 */  \
    local_time += 500;                 \
                                       \
    /* add in the local time to the total time */  \
    *drawing_time += local_time;       \
    }

/*-----------------------------------------------------------------------*
 *  W E I G H _ M W _ T O P:
 *      This function is used to get the drawing time for a top phrase.
 *-----------------------------------------------------------------------*/
void weigh_mw_top(vis,x1,x2,x3,x4,dx,dy,dx_width,dy_width,dy_chord,time)
    u_byte vis;
    s_long x1,x2,x3,x4,dx,dy,dx_width,dy_width;
    s_long *dy_chord;
    register u_long *time;
{
    s_short start_band, next_band;
    s_long real_dx_width, temp_dy_chord;
    extern u_short gr_log_nscan;

/* get the starting and next band numbers */
    start_band = x1 >> gr_log_nscan;
    next_band = x2 >> gr_log_nscan;

/* get the width of the last scan in the top */
    if (next_band == start_band)
        {
        /*
         *  The whole top is in this band
         */
        *dy_chord = ABoverC(dy, dx_width, dx) - dy_width;

/* get the drawing time for the top */
        *time = 0;
        WEIGH_CORNER(vis, dx_width, *dy_chord, time);

/* add the top pause time */
        *time += 360;

/* get the band crossing for the middle */
        next_band = x3 >> gr_log_nscan;
```

```
        if (next_band == start_band)
           {
           /*
            *  The whole middle is in this band
            */
           WEIGH_MIDDLE(vis, dy, (x3-x2), *dy_chord, time);

/* add the bottom pause time */
           *time += 270;

/* get the band crossing for the bottom */
           next_band = x4 >> gr_log_nscan;

if (next_band == start_band)
              {
              /*
               *  The whole bottom is in this band.
               *  Get the bottom drawing time.
               */
              WEIGH_CORNER(vis, dx_width, *dy_chord, time);
              }
           else
              {
              /*
               *  The whole bottom is NOT in this band.
               *  Get the drawing time of the part of
               *  the bottom that is in this band.
               */
              real_dx_width = ((start_band+1) << gr_log_nscan) - x3;
              temp_dy_chord = ABoverC(dy, real_dx_width, dx) - dy_width;
              WEIGH_CORNER(vis, real_dx_width, temp_dy_chord, time);
              }
           }
       else
           {
           /*
            *  The whole middle is NOT in this band.
            *  Get the drawing time of the part of
            *  the middle that is in this band.
            */
           WEIGH_MIDDLE(vis, dy, (((start_band+1)<<gr_log_nscan)-x2), *dy_chord
           }
        }
     else
        {
        /*
         *  The whole top is NOT in this band.
         *  Get the drawing time of the part of
         *  the top that is in this band.
         */
        real_dx_width = ((start_band+1) << gr_log_nscan) - x1;
        temp_dy_chord = ABoverC(dy, real_dx_width, dx) - dy_width;
        *time = 0;
        WEIGH_CORNER(vis, real_dx_width, temp_dy_chord, time);
        }

/* add register load time */
     *time += 1800;

/* bring up to minimal setup and load time */
     if (*time < 3700)
         *time = 3700;
     }

/*-----------------------------------------------------------------*
 *  W E I G H _ M W _ M I D D L E:
 *     This function is used to get the drawing time for a middle phrase.
 *-----------------------------------------------------------------*/
void weigh_mw_middle(vis, startx, x3, x4, dx, dy, dx_width, dy_width,
        dy_chord, time)
    u_byte vis;
    register s_long startx, x3, x4;
```

```
    s_long dx, dy;
    register s_long dx_width;
    register s_long dy_width;
    register s_long dy_chord;
    register u_long *time;
    {
    s_short start_band, next_band;
    s_long real_dx_width, temp_dy_chord;

/* get the starting and next band numbers */
    start_band = startx >> gr_log_nscan;
    next_band = x3 >> gr_log_nscan;

/* get the drawing time for the middle */
    if (next_band == start_band)
        {
        WEIGH_MIDDLE(vis, dy, (x3-startx), dy_chord, time);

/* add the bottom pause time */
        *time += 270;

/* get the band crossing for the bottom */
        next_band = x4 >> gr_log_nscan;

if (next_band == start_band)
            {
            /*
             * The whole bottom is in this band.
             * Get the bottom drawing time.
             */
            WEIGH_CORNER(vis, dx_width, dy_chord, time);
            }
        else
            {
            /*
             * The whole bottom is NOT in this band.
             * Get the drawing time of the part of
             * the bottom that is in this band.
             */
            real_dx_width = ((start_band+1) << gr_log_nscan) - x3;
            temp_dy_chord = ABoverC(dy, real_dx_width, dx) - dy_width;
            WEIGH_CORNER(vis, real_dx_width, temp_dy_chord, time);
            }
        }
    else
        {
        WEIGH_MIDDLE(vis, dy, (((start_band+1)<<gr_log_nscan)-startx), dy_chord,
        }

/* add register load time */
    *time += 1800;

/* bring up to minimal setup and load time */
    if (*time < 3700)
        *time = 3700;
    }

/*-------------------------------------------------------------------*
 * G R _ I N I T _ A U T O Q U A L I T Y ( ):
 *
 * This function is called at gr_open() time to do initialization of the
 * autoquality tables.
 *-------------------------------------------------------------------*/
bool gr_init_autoquality()
    {
    s_long i, j;
    u_long time;

/*-----------------------------*
     * Init rectangle table
     *-----------------------------*/
    gr_AQ_max_rect_scan_words = -1;
    gr_AQ_max_rect_dx = -1;
```

```
for (i=0; i < MAX_RECT_SCAN_WORDS; i++)
    {
    gr_AQ_rect_table[i] = 0;
    gr_AQ_rect_table[i] = (u_long *)ctl_malloc(MAX_RECT_DX*sizeof(u_long));
    if (gr_AQ_rect_table[i] == NULL)
        return(FALSE);
    } for (i=0; i < MAX_RECT_SCAN_WORDS; i++)
    {
    for (j=0; j < MAX_RECT_DX; j++)
        {
        WEIGH_RECT(8, (8+(i<<4)), j, time);
        *((gr_AQ_rect_table[i])+j) = time;
        }
    } gr_AQ_max_rect_scan_words = MAX_RECT_SCAN_WORDS;
gr_AQ_max_rect_dx = MAX_RECT_DX;

/*-----------------------------*
 *  Init X-only table
 *-----------------------------*/
gr_AQ_xonly_table = (u_long *)ctl_malloc(MAX_XONLY*sizeof(u_long));
if (gr_AQ_xonly_table == NULL)
    return(FALSE);

gr_AQ_max_xonly = -1;

for (i=0; i < MAX_XONLY; i++)
    {
    WEIGH_SW_XONLY(i, time);
    gr_AQ_xonly_table[i] = time;
    } gr_AQ_max_xonly = MAX_XONLY;

/*-----------------------------*
 *  Init Y-only table
 *-----------------------------*/
gr_AQ_yonly_table = (u_long *)ctl_malloc(MAX_YONLY*sizeof(u_long));
if (gr_AQ_yonly_table == NULL)
    return(FALSE);

gr_AQ_max_yonly = -1;

for (i=0; i < MAX_YONLY; i++)
    {
    WEIGH_SW_YONLY(8, ((i<<4)+8), time);
    gr_AQ_yonly_table[i] = time;
    } gr_AQ_max_yonly = MAX_YONLY;

/*-----------------------------*
 *  Init single-width table
 *-----------------------------*/
gr_AQ_max_snglw_dx = -1;
gr_AQ_max_snglw_dy = -1;

for (i=0; i < MAX_SNGLW_DX; i++)
    {
    gr_AQ_snglw_table[i] = 0;
    gr_AQ_snglw_table[i] = (u_long *)ctl_malloc(MAX_SNGLW_DX*sizeof(u_long))
    if (gr_AQ_snglw_table[i] == NULL)
        return(FALSE);
    } for (i=0; i < MAX_SNGLW_DX; i++)
    {
```

```
        for (j=0; j < MAX_SNGLW_DY; j++)
            {
            WEIGH_SW(i, j, time);
            *((gr_AQ_snglw_table[i])+j) = time;
            }
        } gr_AQ_max_snglw_dx = MAX_SNGLW_DX;
    gr_AQ_max_snglw_dy = MAX_SNGLW_DY;

/*----------------------------*
     * Init trapezoid table
     *----------------------------*/
    gr_AQ_max_trap_dx = -1;
    gr_AQ_max_trap_dy = -1;

for (i=0; i < MAX_TRAP_DX; i++)
        {
        gr_AQ_trap_table[i] = 0;
        gr_AQ_trap_table[i] = (u_long *)ctl_malloc(MAX_TRAP_DX*sizeof(u_long));
        if (gr_AQ_trap_table[i] == NULL)
            return(FALSE);
        } for (i=0; i < MAX_TRAP_DX; i++)
        {
        for (j=0; j < MAX_TRAP_DY; j++)
            {
            WEIGH_TRAP(FULLY_VIS, 0, i, 8, (8+(j<<4)), 8, (8+(j<<4)), time);
            *((gr_AQ_trap_table[i])+j) = time;
            }
        } gr_AQ_max_trap_dx = MAX_TRAP_DX;
    gr_AQ_max_trap_dy = MAX_TRAP_DY;

/* initialize gr_draw_raster() vars */
    grCMYlasttime = 0;
    grCMYlastlength = 0;
    grCMYthistime = 0;
    grCMYthislength = 0;

return(TRUE);
    }

/*--------------------------------------------------------------------------------*
 * G R _ F R E E _ A U T O Q U A L I T Y ( ):
 *
 * This function is called at gr_open() time to free the autoquality tables.
 *--------------------------------------------------------------------------------*/
bool gr_free_autoquality()
    {
    s_long i, j;

/*----------------------------*
     * Free Rectangle table
     *----------------------------*/
    for (i=0; i < MAX_RECT_SCAN_WORDS; i++)
        {
        free(gr_AQ_rect_table[i]);
        gr_AQ_rect_table[i] = 0;
        }

/*----------------------------*
     * Free X-only table
     *----------------------------*/
    free(gr_AQ_xonly_table);
    gr_AQ_xonly_table = 0;

/*----------------------------*
```

```
 *  Free Y-only table
 *----------------------------*/
free(gr_AQ_yonly_table);
gr_AQ_yonly_table = 0;

/*----------------------------*
 *  Free single-width table
 *----------------------------*/
for (i=0; i < MAX_SN_DX; i++)
    {
    free(gr_AQ_snglw_table[i]);
    gr_AQ_snglw_table[i] = 0;
    }

/*----------------------------*
 *  Free trapezoid table
 *----------------------------*/
for (i=0; i < MAX_TRAP_DX; i++)
    {
    free(gr_AQ_trap_table[i]);
    gr_AQ_trap_table[i] = 0;
    } return(TRUE);
}
```

What is claimed is:

1. A method for improving the plot produced by a multicolor raster plotter coupled to a host computer, the host computer producing high level graphics commands which are used by the plotter, the method comprising the steps of:

reducing the high level graphics command into simple graphics commands;

dividing the plot into a series of bands;

calculating the time required to perform the simple graphics commands for each individual band;

comparing the time required to perform the simple commands to the maximum speed that the plotter can plot;

storing the simple commands in an external memory when the speed that the plotter can plot is exceeded by the time required to perform the single commands; and printing the simple commands at maximum speed if the time to perform the simple commands is less than the maximum speed of the plotter, wherein further the steps of reducing, dividing, calculating and comparing all occur prior to any printing by the plotter.

2. A control unit for improving the quality of a plot produced by a computer graphics raster plotter, the plotter receiving high level drawing commands, parsing these drawing commands into simple commands in a parsing means, and rasterizing these simple commands in a rasterizing means to produce the plot, the control unit comprising:

time measurement means for calculating the time required to rasterize the simple commands, the time measurement means coupled to the parsing means; and plot quality control means coupled to the time measurement means, the plot quality control means comparing the time required to rasterize the simple commands with the maximum speed of the plotter, commanding the plotter to plot at maximum speed if the time to rasterize the commands is less than the plotter's maximum speed, commanding the plotter to plot at one of a predefined set of slower speeds if the commands cannot be rasterized in less time than the plotter's maximum speed, and commanding the rasterizer means to store the rasterized commands before using these rasterized commands to drive the plotter if commanding the rasterizer will produce the plot faster than commanding the plotter to plot at one of the defined speeds and the commands cannot be rasterized in less time than the plotter's maximum speed, wherein further the plot quality control means only commands the plotter and rasterizer means only after the time measurement means has calculated the time and the plot quality control means has compared the time.

3. A plot quality control unit for use with computer graphics output means that parse and rasterize high level graphics data and commands received from a host computer, the computer graphics output means comprising a graphics plotter, the plotter being driven at one of a predefined group of speeds, the control unit comprising:

time measurement means coupled to the graphics output means for calculating the time required to rasterize the parsed data and commands; and quality control means coupled to the time measurement means, an external memory means for storing computer graphics commands and data in rasterized form, and the computer graphics output means for controlling, based on the time measurement, the computer graphics output means to produce the best possible plot, wherein the quality control means accepts the estimated times from the time measurement means, compares the estimated time to the maximum speed that the plotter can rasterize and plot data and commands, commands continuous maximum speed rasterizing and plotting if the maximum speed is greater than the estimated time, commands plotting at one of the predefined speeds if the estimated times exceed the maximum speed and the predefined speed permits continuous plotting, and commands storage of the rasterized data and command on the exterior memory means if the estimated time exceeds the maximum speed and the plot can be completed more quickly by storing and later plotting at maximum speed than by plotting at a predefined speed.

4. The plot quality control unit of claim 3 wherein the computer graphics output means is a computer graphics multicolor raster plotter.

5. A method for improving the quality of computer graphics plots produced by computer graphics plotters and displays which parse high level data and commands received from a host computer and rasterize the parsed data and commands, the rasterized data and commands being used by the plotter to produce the plot, the method comprising estimating the time required to rasterize the parsed data and commands;

comparing the time estimated to rasterize the data and commands to a known maximum speed that the data and commands can be rasterized;

producing the plot at the known maximum speed if the estimated time is less than the maximum speed;

producing the plot at a speed slower than the maximum speed if the estimated time is greater than the maximum speed; and storing all rasterized data and commands in an external memory prior to using them to produce the plot at maximum speed, if the estimated time exceeds the maximum speed and if the total time to store the data and produce the plot at maximum speed is less than the total time to produce the plot at the slower speed.

* * * * *